(12) United States Patent
Zhang et al.

(10) Patent No.: US 12,210,987 B2
(45) Date of Patent: Jan. 28, 2025

(54) SYSTEM AND METHOD FOR CONTROLLING MOTION OF A BANK OF ELEVATORS

(71) Applicants: Mitsubishi Electric Research Laboratories, Inc., Cambridge, MA (US); Mitsubishi Electric Corporation, Tokyo (JP)

(72) Inventors: Jing Zhang, Weymouth, MA (US); Athanasios Tsiligkaridis, Boston, MA (US); Hiroshi Taguchi, Tokyo (JP); Daniel Nikolaev Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1232 days.

(21) Appl. No.: 16/929,744

(22) Filed: Jul. 15, 2020

(65) Prior Publication Data
US 2022/0019948 A1 Jan. 20, 2022

(51) Int. Cl.
| | |
|---|---|
| G06Q 10/06 | (2023.01) |
| B66B 1/24 | (2006.01) |
| G06N 3/08 | (2023.01) |
| G06Q 10/0631 | (2023.01) |

(52) U.S. Cl.
CPC ....... *G06Q 10/0631* (2013.01); *B66B 1/2408* (2013.01); *G06N 3/08* (2013.01); *B66B 2201/235* (2013.01); *B66B 2201/402* (2013.01)

(58) Field of Classification Search
CPC .............. G06Q 10/0631; B66B 1/2408; B66B 2201/235; B66B 2201/402; B66B 1/2458; G06N 3/08
See application file for complete search history.

(56) References Cited

U.S. PATENT DOCUMENTS

| | | | |
|---|---|---|---|
| 8,655,799 B1 * | 2/2014 | Rubin | G06N 3/126 700/28 |
| 9,834,405 B2 | 12/2017 | Nikovski | |

(Continued)

FOREIGN PATENT DOCUMENTS

EP 03581533 12/2019

OTHER PUBLICATIONS

De Brebisson et al., "Artificial Neural Networks Applied to Taxi Destination Prediction" arXiv:1508.00021v2 [cs.LG] Sep. 21, 2015.
(Continued)

*Primary Examiner* — Joseph J Dallo
(74) *Attorney, Agent, or Firm* — Gene Vinokur

(57) ABSTRACT

A control system for controlling motion of elevators of a bank of elevators uses a neural network trained for an extended destination prediction of a person based on a partial trajectory of the person to produce a multinomial of the extended destination prediction. The multinomial has at least two dimensions including a first dimension of destinations of the person and a second dimension of time intervals of the person arriving at the destinations of the first dimension. The control system optimizes a schedule of the bank of elevators based on the multinomial, and further controls the bank of elevators according to the schedule.

13 Claims, 14 Drawing Sheets

(56) References Cited

U.S. PATENT DOCUMENTS

| | | | |
|---|---|---|---|
| 2014/0360817 A1* | 12/2014 | Putkinen | B66B 1/2458 187/247 |
| 2018/0086597 A1* | 3/2018 | Song | G05B 15/02 |
| 2018/0374497 A1* | 12/2018 | Furuta | G10L 25/30 |
| 2019/0377349 A1* | 12/2019 | van der Merwe | G05D 1/0257 |
| 2020/0130983 A1* | 4/2020 | Karve | B66B 1/2458 |
| 2020/0130984 A1* | 4/2020 | Wang | B66B 1/468 |
| 2021/0024326 A1* | 1/2021 | Polak | B66B 5/0012 |

OTHER PUBLICATIONS

Vaswani et al., "Attention Is All You Need" arXiv:1706.03762v5 [cs.CL] Dec. 6, 2017. 31st Conference on Neural Information Processing Systems (NIPS 2017), Long Beach, CA, USA.
Giulari et al., "Transformer Networks for Trajectory Forecasting" arXiv:2003.08111v2 [cs.CV] May 14, 2020.

* cited by examiner

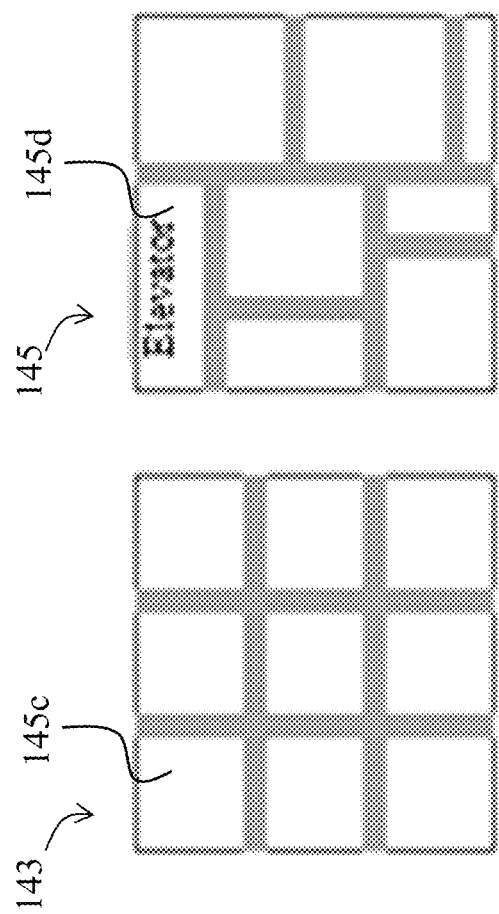

SYSTEM AND METHOD FOR CONTROLLING MOTION OF A BANK OF ELEVATORS

TECHNICAL FIELD

The present disclosure relates generally to elevator destination prediction and scheduling, and more specifically to a system and method for controlling motion of a bank of elevators.

BACKGROUND

Nowadays, elevators are commonly used in offices and residential buildings on day to day basis. The elevators (also called "cars") in an elevator bank are coupled with control systems which determine destination of elevators and control scheduling of the elevators.

Some control systems are configured to predict the destination of the elevators. Such predicted destinations include information of arrivals of future passengers of the elevators. Based on the predicted destination, the elevators are scheduled. Generally, scheduling a group of elevators (also called Group Elevator Scheduling (GES)) is a combinatorial optimization problem for an elevator bank with two or more cars. The goal of the most common instance of this problem is to assign elevator cars to passengers requesting an elevator car by pressing an UP or DOWN button. On receiving the requests, a scheduler assigns a car to each passenger so that a performance metric, e.g., an Average Waiting Time (AWT) for all passengers is minimized. The AWT is defined as the length of a time interval, from the moment a passenger makes the request until a car arrives, averaged over many requests of passengers. To that end, various scheduling methods have been identified.

Most existing schedulers only service known requests and destinations, that is, they ignore future arrivals of the passengers altogether. Some recently proposed schedulers use algorithms that consider statistics of arrivals of future passengers, see, e.g., U.S. Pat. No. 9,834,405. However, the statistical estimation of the arrival times of the future passengers is laborious and often does not provide accurate representation of actual future requests for the elevator service.

Accordingly, there is a need of a system that more accurately determines arrival of the future passengers for scheduling elevators.

SUMMARY

It is an objective of some embodiments to provide a system and a method for predicting destination of future passengers and scheduling elevator cars in a group elevator system (GES), and more particularly to determine predictive information regarding arrival times of future passengers at any floor of a building. Further, it is an objective of some embodiments to determine a schedule for the GES including a group of elevator cars based on the predictive information, where the schedule optimizes a performance metric by minimizing an Average Waiting Time (AWT) for all passengers.

Some embodiments formulate a problem of prediction of occurrences of future elevator requests and time of the occurrences of the future elevator requests as an extended destination prediction problem. The destination prediction problem aims to estimate a final destination of a trajectory of a passenger based on partial observations of the trajectory. Hence, the destination prediction problem can be used to estimate the final destination of a person based on his/her current motion and consider the person as a future passenger if the final destination is within an elevator request area, such as near the elevator call button or otherwise associated with an elevator request. However, accurate destination prediction is a notoriously difficult problem. Moreover, just predicting whether a person would request an elevator service or not is insufficient, i.e., there is also a need to estimate a time of such a future elevator request.

Hence, the extended destination prediction problem extends the destination prediction problem by predicting not only the final destination of the trajectory, but the time of arrival at the final destination. In addition, the extended destination prediction problem replaces prediction of whether a destination of a person is associated with an elevator request with just prediction of various possibilities of destinations, which is computationally simpler and can benefit designing and training extended destination prediction, as described below.

Further, some embodiments are based on model-based or deep learning-based approaches for solving the extended destination prediction problem. Some embodiments are based on a realization that artificial intelligence (AI)-based destination prediction for the requirement of elevator scheduling is difficult. More specifically, such an adaptation to predict destination of the passenger by the AI-based destination prediction is difficult because a person (i.e. the passenger) in a typical office setting has a lot of freedom of movement and destination choices and an incomplete trajectory of the person may lead to a variety of final destinations. Moreover, in the office settings, the notion of final destination is illusive, i.e., any final destination can be an intermediate one and vice versa. In such a manner, prediction of whether the final destination of the partial trajectory is an elevator request area is challenging. In addition, prediction of distribution of time of arrival, for example in the Gauss-Bernoulli distribution, by a neural network is difficult to achieve, because the neural network cannot easily provide a probability distribution of the needed type as its continuous output.

To that end, some embodiments are based on the realization of training the neural network to output results of destination prediction in a form of a multinomial distribution. In some implementations, the multinomial is two-dimensional having one dimension to define the destinations and the other dimension to define the times of arrival. The two-dimensional multinomial distribution can be visualized as a matrix having, e.g., names of destinations for columns or rows, intervals of time for rows or columns and values of the matrix defining probabilities of arrival at the corresponding destination at a corresponding interval of time. The interval of time can be denoted by the instance of time in the beginning, middle or the end of this interval. Further, the sum of all values in the matrix is equal to "1" reflecting the probabilistic nature of the multinomial distribution. To achieve this, some embodiments define an exhaustive list of destinations to ensure that if the motion of the person is detected, the person will have a final destination in the defined list of destinations. More specifically, an area serviced by an elevator system (e.g., a floor in an office building) is quantized into a tessellation of locations, referred herein as tessellation elements. As contrasted with semantic destinations, like kitchen, corridor, meeting room, or the likes, such a quantization ensures the exhaustive list of destinations and better align with various motion sensing methods.

As used herein, tessellation is an arrangement of shapes closely fitted together in a pattern without gaps or overlapping. Examples of the shapes include squires, rectangles, polygons, and the like. When the tessellation uses the squared shapes, such a tessellation can also be referred as a regular grid or just as a grid. When the tessellation uses rectangular shapes of different dimensions, such a tessellation can also be referred as an irregular grid. In different embodiments, the tessellation elements can have the same or different shapes to better fit in the layout of the area serviced by an elevator system.

In some embodiments, sensing and tracking of the passenger on the floor is implemented by radio antennas that are located every few meters in the building. Accordingly, a "location N" or "tessellation element N" indicates that the passenger is detected by an antenna number N. If multiple antennas detect the passenger, the number of the sensing antennas can be determined by a fixed tie-breaking order of the antennas. In some other embodiments, the person is detected by means of other sensors such as camera sensors In addition, the time dimension is also quantized into a set of intervals of time defining a time period for the prediction (also called as a period of prediction). The time period and granularity of the quantization can depend on computation capabilities and/or be defined by application requirements. Thus, the period of prediction is configurable. For example, in some embodiments, the destination prediction is for the next 10 seconds, accordingly the quantized time period in the multinomial distribution is 10 seconds.

In some embodiments, training the prediction neural network to output prediction estimation in a form of the multinomial has a number of advantages. First, the multinomial replaces an individual prediction of a probability of arrival to an elevator request area with a joint prediction of arrival at any destination where the elevator request area is one of the destinations. Hence, a probability of arriving at the elevator request area is naturally determined with respect to other destinations when two conditions are satisfied. The two conditions include the list of destinations being exhaustive and the sum of all values in the multinomial equal to "1". The first requirement is satisfied by space quantization and the second requirement is enforced during the training of the neural network. In such a manner, the extended destination prediction of probability of arrival at an elevator request area is simplified. Second, the time dimension of the multinomial eliminates the necessity of continuous output for the time of arrival as required in existing systems (for example, in the Gauss-Bernoulli distribution). This is because different values for the elevator request area determined for different time instances represent samples on the continuous distribution of time of arrival with corresponding probabilities defined by the values for the elevator request area. In fact, the probability distribution of the time of arrival can be derived by interpolating values of the probability of arrival in the elevator request area at different time instances. However, different embodiments are implemented to use the values of arrival at different time instances without building probability distribution. This is advantageous, because such implementations do not limit the extended destination prediction to any specific type of distribution.

Further, the time dimension of multinomial distribution can define the period of interest for destination prediction. In one embodiment, this period corresponds to the maximum time period in which a person will reach the elevator. In another embodiment, such period is determined by the scheduler. This is advantageous because it allows replacing prediction of whether and when a passenger will arrive at an elevator request area with a prediction where the passenger will arrive within the next prediction period. Such a reformulation of the problem simplifies training of AI-based extended destination prediction estimator.

In some embodiments, historical trajectories data may be utilized to train a neural network model and predict destinations and arrival times of potential future passengers as per their partial trajectories. A whole arrival stream, considered in a scheduling task for the elevator cars on any floor at a current time, includes the arrivals of the current passengers (who have arrived and made a request for service), and the predicted arrivals of future passengers, where the latter are termed as continuation sets of the current arrival stream.

In some embodiments, the bank of elevators is scheduled by considering current and future service requests using continuation sets. Such continuation sets are obtained based on execution of simulations (e.g. Monte Carlo simulation). Each continuation set includes current request and a combination of future requests. Individually, each continuation set is deterministic, because both the current and the future request are considered as actual requests. But collectively, different combinations of future requests in different continuation sets allow some embodiments to capture probabilistic nature of the future requests.

To that end, some embodiments are based on a realization that not all destinations in the multinomial are associated with an area service by the elevators. Accordingly, in such embodiments, the multinomial is filtered based on the destinations which are related to the area serviced by the bank of elevators. Based on the filtering, the continuation sets are obtained by drawing samples from the multinomial produced by the destination predictor, based on the destinations which are associated with the area serviced by the elevators, such that precise continuation sets are obtained for the destination related to the area serviced by the elevators.

In some embodiments, a destination predictor is utilized to determine the multinomial for predicting the future arrivals of passengers. Such a destination predictor is implemented based on deep learning-based approaches (Deep neural network (DNN)). The deep learning-based methods have an ability to be adapted to non-language applications, such as destination/trajectory prediction. Examples of the DNN include, but are not limited to, Recurrent Neural Networks (RNN), Long short-term memory (LSTM) based neural network, Bi-LSTM based neural network, transformer architecture based neural network.

Some embodiments are based on the realization that transformer architecture can be advantageous for the extended destination prediction. The transformer architecture of the DNN is utilized for various speech related applications such as language translation, natural language understanding, and document generation. The transformer architecture is devoid of any recurrent cell units present in RNN models and instead relies on a more effective attention module for relating elements in a sequence. Some embodiments are based on the realization that extended destination prediction can be seen as a transcription of partial trajectory due to mapping nature of the transformer architecture, which makes the transformer architecture applicable to the extended destination prediction tasks. Accordingly, in some embodiments, the destination predictor uses the transformer-based neural network architecture. Both positional and timing components in the sensed trajectories data are discretized. The continuation sets are formed by filtering the predicted destinations with respect to elevator landings. To deal with uncertainties in the arrival times, Monte Carlo simulations are applied to generate multiple continuation sets, by drawing samples from the multinomial distribution produced by the neural net. Once a complete arrival stream of current and potential future passengers is obtained, in the form of multiple continuations, the schedule to control the elevators is determined, for example by using the method described in U.S. Pat. No. 9,834,405, Method and system for scheduling elevator cars in a group elevator system with uncertain information about arrivals of future passengers.

Accordingly, one embodiment discloses a control system for controlling motion of elevators of a bank of elevators, the control system comprising a first input interface configured to accept current requests from passengers for service by the bank of elevators; a second input interface configured to receive a partial trajectory of a motion of a person moving on a floor that comprises an area serviced by the bank of elevators. The control system further comprises a processor configured to execute, upon receiving the partial trajectory of the motion of the person, a neural network trained for an extended destination prediction of the person having the motion according to the partial trajectory to produce a multinomial of the extended destination prediction for the person, where the multinomial has at least two dimensions including a first dimension of destinations of the person and a second dimension of time intervals of the person arriving at the destinations of the first dimension, and where a sum of values of the multinomial is normalized to one. Further, the floor is quantized into tessellation elements forming the destinations of the first dimension, and where at least one tessellation element is associated with the area serviced by the bank of elevators. The processor is further configured to optimize a schedule of the bank of elevators to serve the current requests from passengers and future requests of the persons, for elevator service at the time instances provided in the multinomial with probabilities of corresponding values in the multinomial determined for the tessellation element associated with the area serviced by the bank of elevators; and control the bank of elevators according to the schedule.

Further, the time intervals of the second dimension quantize a period of prediction, and where the period of prediction is the maximum time considered by the control system for the future requests of the persons.

In another embodiment, the processor is further configured to draw samples from the multinomial distribution determined for the tessellation element associated with the area serviced by the bank of elevators to produce multiple combinations of times of request, where a frequency of occurrence of a specific time instance in the multiple combinations of times of request is a probability of future request for the elevator service at the specific time interval having a value in the multinomial at an intersection of the specific time interval and the tessellation element associated with the area serviced by the bank of elevators. The actual time of the request is assumed to be the beginning or midpoint of the time interval of the multinomial distribution. The processor is further configured to combine each of the multiple combinations of times of request with the current request to produce multiple continuation sets; and determine the schedule of the bank of elevators to optimize a metric of performance for at least some passengers in combination of all of the continuation sets.

In another embodiment, the partial trajectories comprise trajectories data containing only positional information, where each trajectory is represented by a sequence of tessellation indices, where the tessellation indices are obtained by discretizing range of positional coordinates, and where the range of positional coordinates represent longitudes and latitudes associated with the tessellation elements.

In another embodiment, the partial trajectories comprise trajectories data containing both positional information and timing information, where each trajectory is represented by a sequence of tuples of tessellation indices, and where each tuple contains tessellation indices obtained by discretizing a range of positional coordinates and the period of prediction.

In another embodiment, the timing information of trajectories is extracted by considering relative times in terms of elapsed times with respect to their starting time stamps.

In another embodiment, each trajectory is represented by a sequence of symbols, and where each symbol is mapped from a tuple of tessellation indices that indicates the positional information and the timing information.

In another embodiment, the continuation sets are formed through filtering the destinations by considering only the area serviced by the bank of elevators.

In another embodiment, the neural network has transformer architecture, where the transformer architecture uses a positional encoding and an attention mechanism, that enables parallelization.

Another embodiment discloses, a method for controlling motion of elevators of a bank of elevators, the method comprising obtaining current requests from passengers for service by the bank of elevators; obtaining a partial trajectory of a motion of a person moving on a floor that comprises an area serviced by the bank of elevators. The method further comprising executing, upon receiving the partial trajectory of the motion of the person, a neural network trained for an extended destination prediction of the person having the motion according to the partial trajectory to produce a multinomial of the extended destination prediction for the person, where the multinomial has at least two dimensions including a first dimension of destinations of the person and a second dimension of time intervals of the person arriving at the destinations of the first dimension. Further, the floor is quantized into tessellation elements forming the destinations of the first dimension, and where at least one tessellation element is associated with the area serviced by the bank of elevators. The method further comprising optimizing a schedule of the bank of elevators to serve the current requests from passengers and future requests of the persons, for elevator service at the time intervals provided in the multinomial with probabilities of corresponding values in the multinomial determined for the tessellation element associated with the area serviced by the bank of elevators; and controlling the bank of elevators according to the schedule.

In another embodiment, the method further comprising performing a Monte Carlo simulation of the arrival process by drawing samples from the multinomial determined for the tessellation element associated with the area serviced by the bank of elevators to produce multiple combinations of times of request, where a frequency of occurrence of a specific time interval in the multiple combinations of times of request is a probability of future request for the elevator service at the specific time interval having a value in the multinomial at an intersection of the specific time interval and the tessellation element associated with the area serviced by the bank of elevators; combining each of the multiple combinations of times of request with the current request to produce multiple continuation sets; and determining the schedule of the bank of elevators to optimize a metric of performance for at least some passengers in combination of all of the continuation sets.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1C illustrates quantization of a floor in tessellation elements of a regular grid for multinomial distribution, according to an example embodiment of the present disclosure.

FIG. 1D illustrates quantization of the floor in tessellation elements of irregular grid for the multinomial distribution, according to an example embodiment of the present disclosure.

Figure 1A:
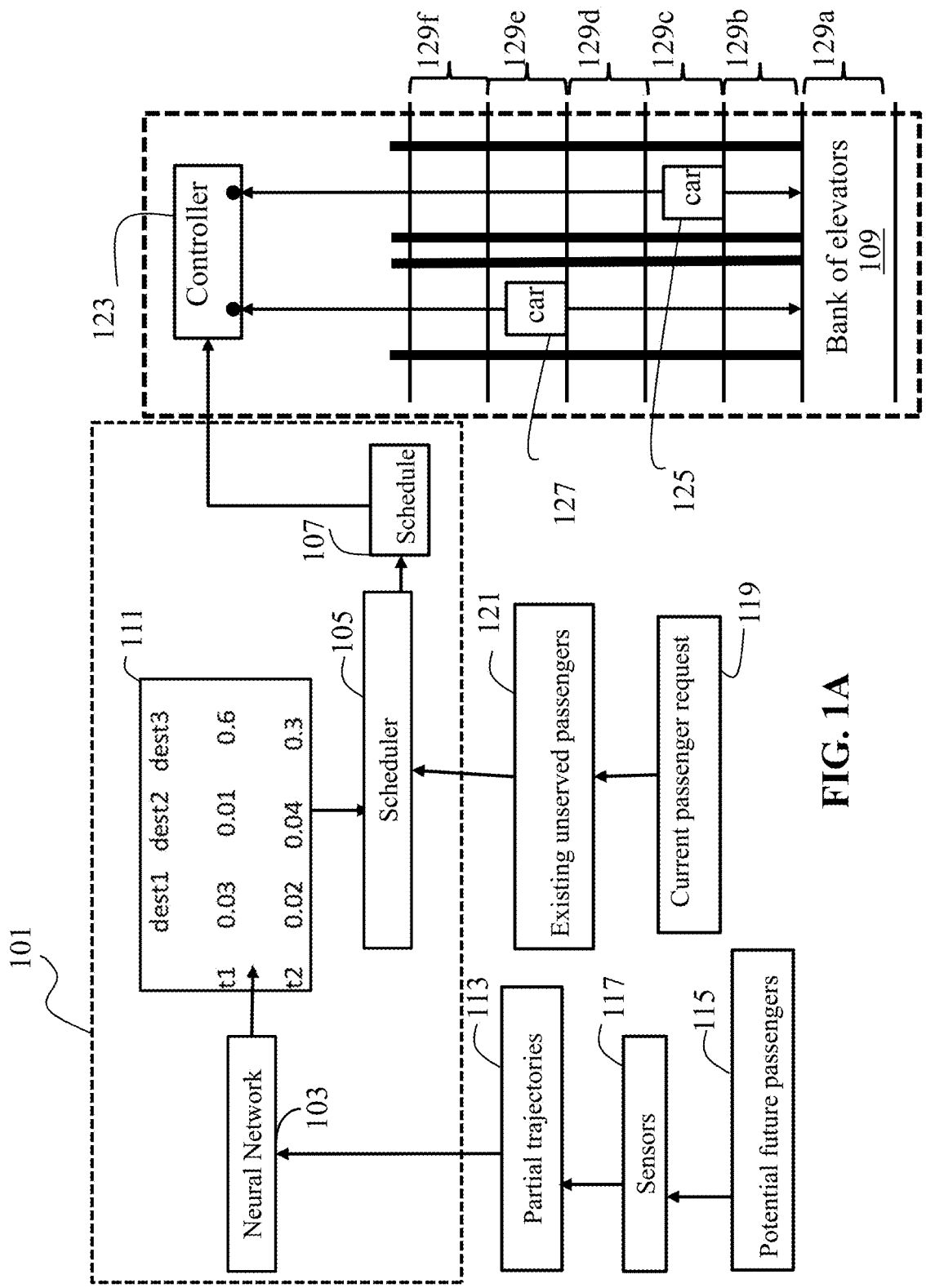
FIG. 1A illustrates an environment for a control system for controlling motion of a bank of elevators, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

The present disclosure discloses a control system to provide a solution for GES problem explained earlier. A GES control system uses a scheduler to assign elevator cars to passengers such that a performance metric, e.g. average waiting time (AWT) for the passengers is minimized. Currently, many schedulers service only known requests (or currently existing requests) and known destinations to optimize the AWT. These requests have typically been communicated to the GES system directly by the passengers, using hall call and car call buttons. However, it would be advantageous if the scheduler can determine a schedule for the elevator cars by taking future requests for the elevator service into consideration. The AWT can be minimized significantly by taking the information associated with the future requests in consideration.

For example, a first passenger on a sixth floor of a building requests service from a bank of elevator to go to first floor of the building. Consider that an elevator car assigned to provide service to the first passenger is currently at fifteenth floor. Consider that in next five seconds a second passenger on tenth floor will also request the service to go the first floor. In this case, the scheduler determines beforehand this information associated with arrival of future passenger i.e. the second passenger, the scheduler may determine a schedule such that the elevator car on the fifteenth floor may wait for five seconds till the future passenger i.e. the second passenger requests the service to go to the first floor. On reception of the request from the second passenger, the elevator car may first pick up the second passenger from the tenth floor and then may pick the first passenger on the sixth floor, accordingly both the passengers may arrive on the first floor together. Thus, it is desired to have some information about future arrivals to further optimize the AWT of the passengers.

However, there are problems associated with using information of the future arrivals for scheduling. It is difficult to predict a probability of service requests by the future passengers and a probability of possible times of the service requests. Further, even if these probabilities are somehow determined or predicted, it is still difficult to use these probabilities for scheduling purposes.

To address these problems, some schedulers may use algorithms, which take known services (i.e. existing or current service requests), known destinations, and probability of arrivals of future passengers into account. These schedulers may account for the arrivals of future passengers by first generating a set of probability distributions for such arrivals at any floor of the building, where the set of probability distributions are characterized by probabilistic variables (i.e. the probability of service requests by the future passengers and the probability of possible times of the service requests) that specify arrival information of the future passengers.

Some embodiments are based on understanding that schedulers can determine the arrival information based on the set of probability distributions, where the set of probability distributions (i.e. arrival information of future passengers) is assumed to follow some known forms of distribution; for example, a Gauss-Bernoulli probabilistic distribution. As the arrival of the future passengers is assumed, the set of probability distributions is not accurate. Consequently, the scheduler may not be able to effectively optimize the AWT for the current and the future passengers.

To address such issues, the present disclosure proposes a control system that replaces statistical estimation of probabilistic distributions of the future arrivals to predict future arrivals of passengers.

FIG. 1A illustrates an environment for a control system 101 for controlling motion of a bank of elevators 109, according to an embodiment of the present disclosure.

The control system 101 may predict arrival information of potential future passengers based on trajectories of the passengers. The predicted arrival information is used to determine a schedule (the schedule 107) for elevator cars (such as cars 125 and 127) of the bank of elevators 109 to service passengers for a desired floor from a set of floors 129a, 129b, 129c, 129d, 129e, and 129f (also called as the set of floors 129a to 129b) in a building (not shown in FIG. 1A).

To that end, the control system 101 may accept one or more current passenger requests 119 from one or more passengers for service provided by the bank of elevators 109, and receive partial trajectories 113 of a motion of each of the one or more persons (i.e. one or more passengers) moving on a floor (for example, a floor of the set of floors 129a to 129f) that comprises an area serviced by the bank of elevators 109. The partial trajectories 113 may comprise data associated with movements of potential future passengers 115 in any floor of the set of floors 129a to 129f. The control system 101 may use sensors 117 to capture the movements of the potential future passengers 115 in order to determine partial trajectories 113 of the potential future passengers 115, where each partial trajectory may be incomplete and its final destination is yet to be predicted.

Further, the control system 101 may utilize the partial trajectories 113 as input to the neural network 103, which may predict arrival information of potential future passengers as output in a form of a multinomial 111, where the arrival information may include all the possible destinations and corresponding time instances.

The multinomial 111 is a two-dimensional entity having one-dimension corresponding to the destination (e.g. dest1, dest2, and dest3) and the other dimension corresponding to the time of arrival (e.g. t1 and t2). In particular, the two-dimensional multinomial distribution may be a matrix having names of destinations for columns or rows and instances of time for rows or columns, where values of the matrix defining probabilities of arrival at the corresponding destination at a corresponding interval of time. The destinations of the first dimensions are obtained by quantizing each floor of the set of floors 129a to 129f into tessellation elements. As the destinations are obtained by quantizing the floor (for example 129a) the destinations may correspond to different locations on the floor. For example, destination 1 may be a cafeteria, destination 2 may be a service request area, and destination 3 may be a cabin, located on the floor. Simultaneously, the time dimension is also quantized into a set of intervals of time (e.g. t1 and t2) defining a time period of interest for the prediction.

Accordingly, an extended destination prediction, at each time interval at different destinations, of the person having the motion according to the partial trajectories 113 is performed by the neural network 103. Further, a sum of all values in the matrix is equal to '1' reflecting the probabilistic nature of the multinomial distribution. For instance, the sum of values in the multinomial 111 is 0.03+0.01+0.6+0.02+0.04+0.3=1. This enables the neural network 103 to determine a probability of passengers arriving to a particular destination, say the elevator request area, with respect to other destinations. Accordingly, the accurate destination prediction is executed.

In some embodiments, the neural network 103 may be configured to utilize a time period of interest and a quantization value to determine the arrival of a passenger at different time intervals. For example, if the time period of interest for the prediction is "5 seconds" with a quantization equal to '1 second'. Then according to the multinomial 111, the neural network 103 may predict that arrival of a future passenger is associated with 5 intervals of time (e.g. t1, t2, t3, t4, and t5). Accordingly, the probability of arrival at a specific destination is equal to the sum of values of the destination across all time intervals. Further, the control system 101 utilizes such information to determine the schedule 107 to control operation of the bank of elevators 109.

More specifically, upon receiving the partial trajectories 113, the neural network 103 of the control system 101 may produce the multinomial 111 of the extended destination prediction for one or more persons. The multinomial 111 may have at least two dimensions including a first dimension of destinations of the person and a second dimension of time intervals of each person arriving at the destinations in the first dimension. Each floor of the set of floors 129a to 129f may be quantized into tessellation elements forming the destinations of the first dimension corresponding to each floor. The multinomial 111 may be determined for the entire floor (e.g. the floor) 129a and each tessellation element may be associated with different areas of the floor. At least one area of the different areas corresponds to the area serviced by the bank of elevators 109, and probabilities of corresponding values of the multinomial 111 may be determined for each tessellation element associated with the area serviced by the bank of elevators 109. The list of destinations in the multinomial 111 is exhaustive and the sum of values of in the multinomial is equal to "1", which ensures that a person roaming on the floor (for example 129a) can always be located in at least one destination of the list of destinations.

Further, some embodiments are based on the realization that the AWT of the one or more passengers for the service may be optimized based on information associated with one or more passengers who have currently requested the elevator service and one or more passengers (also called as one or more unserved passengers) for elevator service at the time instances provided in the multinomial 111 with probabilities of corresponding values in the multinomial 111 determined for the tessellation element associated with the area serviced by the bank of elevators 109. Such requests from current passengers are also referred to as current passenger requests 119. Further, the one or more unserved passengers who are not picked by the elevator cars (e.g., car 125 and car 127) are referred to as existing unserved passengers 121. Accordingly, the control system 101 is required to determine a schedule for all the passengers including the unserved passengers such that the AWT for all the passengers is reduced.

To that end, the control system 101 uses the scheduler 105 that determines a schedule 107 for the service by the bank of elevators 109 such that one or more performance metric such as AWT for all passengers is optimized. The scheduler 105 obtains information of the current passenger requests 119 and information of existing unserved passengers 121 along with the predicted arrival information of potential future passengers (i.e. the multinomial 111), to determine the schedule 107 for a controller 123 coupled to the bank of elevators 109.

The bank of elevators 109 comprising multiple cars such as the car 125 and the car 127 installed in a building with multiple floors (the set of floors 129a to 129f). After receiving the schedule 107, the controller 123 issues commands to the car 125 and/or the car 127 to move across the set of floors 129a to 129f to pick up the one or more passengers accordingly.

Figure 1B:
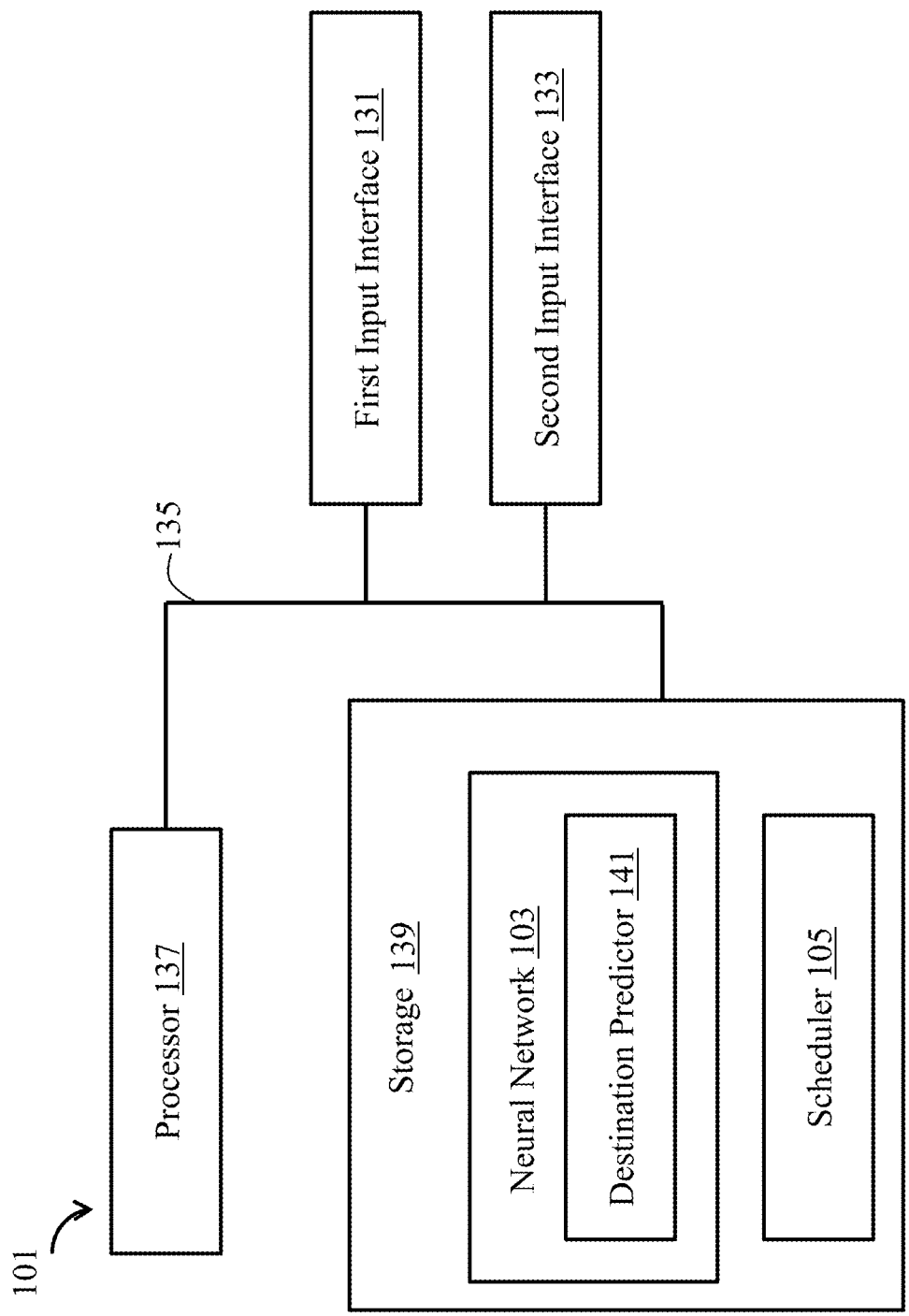
FIG. 1B illustrates a block diagram of the control system, according to an embodiment of the present disclosure.

FIG. 1B illustrates a block diagram of the control system 101, according to an embodiment of the present disclosure.

The control system 101 may comprise a first input interface 131 configured to accept current requests from the one or more passengers for service by the bank of elevators 109. The first input interface 131 may comprise a dashboard including devices (such as buttons, touch screen, and the like) which may be used by the one or more passengers to request service, such as by pressing an up button or a down button. In another embodiment, the first input interface 131 may comprise Destination Control (DC) panel such that the destination floor is determined before getting into the elevator.

Further, the control system 101 may comprise a second input interface 133 which may be configured to receive partial trajectories 113 of motion of the one or more passengers moving on a floor (for example, the floor 129a) that comprises information of the area serviced by the bank of elevators 109. The second input interface 133 may be in direct communication with the sensors 117 (for example the motion sensors) to obtain the partial trajectories 113 of the motion of one or more passengers on the floor.

Each of the first interface 131 and the second interface 133 is connected to other components (such as a processor 137, storage 139, and the like) of the control system 101 through a bus 135. Further, the control system 101 includes the processor 137 configured to execute instructions stored in the storage 139. The processor 137 may be a single core processor, a multi-core processor, a computing cluster, or any number of other configurations. The storage 139 may be a random access memory (RAM), read only memory (ROM), flash memory, or any other suitable memory systems. The processor 137 may be connected through the bus 135 to the other components of the control system 101.

The instructions can implement a method for controlling motion of the bank of elevators 109. To that end, storage 139 may include a set of instructions as a neural network 103 that is used to implement a destination predictor 141. The destination predictor 141 may be implemented to predict destinations of one or more persons. The neural network 103 may obtain the partial trajectories 113 from the second input interface 133. Upon obtaining the partial trajectories 113, the processor 137 may execute the neural network 103 which is trained for an extended destination prediction of a person by producing the multinomial 111 of the extended destination prediction for the person. The processor 137 may be further configured to optimize the schedule 107 to serve the current requests from one or more passengers and future requests of the one or more passengers at the time instances provided in the multinomial 111 with probabilities of corresponding values in the multinomial 111 determined for the tessellation element associated with the area serviced by the bank of elevators 109.

The instructions of the storage 139 further include the scheduler 105 that is configured to assign a car (e.g. the car 125 or the car 127) to each passenger so that a performance metric, e.g., an Average Waiting Time (AWT) for all passengers, is minimized. To that end, the processor 137 is further configured to execute the scheduler 105 to control the bank of elevators 109 according to the schedule 107.

Sensors

The sensors 117 may be installed in areas of the set of floors 129a, 129b, 129c, 129d, 129e, and 129f from where the future passengers arrive. In some example embodiments, the sensors 117 may be motion detectors such as cameras (e.g. surveillance cameras that are commonly located in corridors and hall on the various floors 129a to 129f in the building) or proximity sensors (such as radio antennas) that detect human motion or presence.

In one or more example embodiments, radio antennas as the sensors 117 are located every few meters in the set of floors 129a to 129f of the building. Accordingly, a "location N" or "tessellation element N" indicates that the passenger is detected by an antenna number N. If multiple antennas detect the passenger, the exact number of the primary sensing antenna can be determined by a fixed tie-breaking order of the antennas.

Further, the sensors 117 may be configured to detect the one or more persons at multiple locations in the building, and not necessarily only at elevator doors or corridors leading to the bank of elevators 109. In such a case, when a person is detected at a location l (e.g., in a hallway fifty meter away from the elevator landing), the probability $p_i$, that the person will request elevator service may be determined by correlating sensed data with actual service requests. Further, the control system 101 utilizes the correlation to determine the schedule 107 in an accurate manner.

Further, some embodiments are based on the realization that trajectories (e.g. the partial trajectories 113) of the passengers on the set of floors 129a to 129f can be represented in a manner such that the control system 101 analyses the trajectories in order to determine the schedule 107. Such trajectories may be obtained from the sensors 117. The partial trajectories 113 comprise trajectories data containing only positional information. In some implementations, each trajectory is represented by a sequence of tessellation indices, where the tessellation indices are obtained by discretizing a range of positional coordinates. Further, the range of positional coordinates represents longitudes and latitudes associated with the tessellation elements.

The control system 101 may store these trajectories, of the one or more passengers roaming on each floor of the building, in a database. In some cases, recordings of the trajectories obtained from the sensors 117 for both positions and time stamps are continuous variables. Therefore, directly using the continuous variables may be infeasible for a sequence-to-sequence predictor. Thus, the positional data and timing data may be preprocessed by discretizing them into tessellation indices.

In an example embodiment, given a set of positional coordinates $\{(x_l, y_l); l=1, 2, \ldots, L\}$, where x's and y's denote longitudes and latitudes respectively. Let $x_{min}=\min_{l \in \{1, 2, \ldots, L\}} x_l$, $x_{max}=\max_{l \in \{1, 2, \ldots, L\}} x_l$, $y_{min}=\min_{l \in \{1, 2, \ldots, L\}} y_l$, $y_{max}=\max_{l \in \{1, 2, \ldots, L\}} y_l$. Then the tessellation index $p_l$ of any given tuple of coordinates $(x_l, y_l)$ in an $N_X \times N_Y$ rectangle can be determined as $p_l = \tilde{y}N_X + \tilde{x} + 1$, where $$\tilde{x} = \left\lfloor \frac{x_l - x_{min}}{\Delta x} \right\rfloor \text{ and } \tilde{y} = \left\lfloor \frac{y_l - y_{min}}{\Delta y} \right\rfloor,$$

where quantization interval $$\Delta x = \frac{x_{max} - x_{min}}{X}$$

and quantization interval $$\Delta y = \frac{y_{max} - y_{min}}{N_Y}.$$

The positive integers $N_X$ and $N_Y$ may be taken reasonably large, as long as the computational resources permit. Further, $N_X$ and $N_Y$ may be determined by use of cross-validation, given a set of trajectories data. This embodiment uses these data in the neural network 103 of control system 101 to generate the multinomial 111 for controlling the bank of elevators 109.

As used herein, tessellation is an arrangement of shapes closely fitted together in a pattern without gaps or overlapping. Examples of the shapes include squires, rectangles, polygons, and the like. When the tessellation uses the squared shapes, such a tessellation can also be referred as a regular grid or just as a grid. When the tessellation uses rectangular shapes of different dimensions, such a tessellation can also be referred as an irregular grid. In different embodiments, the tessellation elements can have the same or different shapes to better fit in the layout of the area serviced by an elevator system.

FIG. 1C illustrates quantization of a floor in regular tessellation elements 143 of the regular grid for multinomial distribution, according to an example embodiment of the present disclosure.

Some embodiments are based on the realization that regular tessellation elements 143 facilitate easier computation of trajectories of the one or more passengers on a floor. To that end, each floor of the set of floors 129a to 129f is quantized based on a constant value such that areas of each floor are equally divided. Based on such quantization, the partial trajectories 113 corresponding to each tessellation element of the quantized floor may be analyzed by the control system 101 to produce the multinomial 111. Based on the multinomial 111, the schedule 107 is determined for controlling the bank of elevators 109. One or multiple tessellation elements 145c of the regular tessellation elements 143 corresponds to a service area associated with a request for a service by the bank of elevators. Examples of the service area include area of elevator landing and/or area where the first interface 131 is arranged.

FIG. 1D illustrates quantization of the floor in tessellation elements 145 of an irregular grid for the multinomial distribution, according to an example embodiment of the present disclosure. One or multiple tessellation elements 145d of the irregular tessellation elements 145 corresponds to a service area associated with a request for a service by the bank of elevators.

Some embodiments are based on the realization that the irregular tessellation elements 145 may accurately cover entire area of a floor and facilitate accurate calculations of the trajectories of the one or more passengers on the floor. However, the computation may be very complicated. In an embodiment, the set of floors 129a to 129f is quantized with irregular tessellation elements 145 for determination of the trajectories of the one or more passengers on each floor of the set of floors 129a to 129f.

In some embodiments, information in the multinomial 111 associated with only a number of tessellation elements (e.g. regular tessellation elements 143 or irregular tessellation elements 145) of the quantized floor corresponding to an area serviced by the bank of elevators 109 may be utilized to determine the schedule 107 for controlling the bank of elevators 109. In such cases, a number of tessellation elements of the quantized floor which are not associated with the area serviced by the bank of elevators 109 may be discarded while determining the schedule 107 to control the bank of elevators 109.

In some other embodiments, information associated with all the tessellation elements (e.g. regular tessellation elements 143 or irregular tessellation elements 145) of the quantized floor may be utilized to determine the schedule 107 for controlling the bank of elevators 109.

Figure 1E:
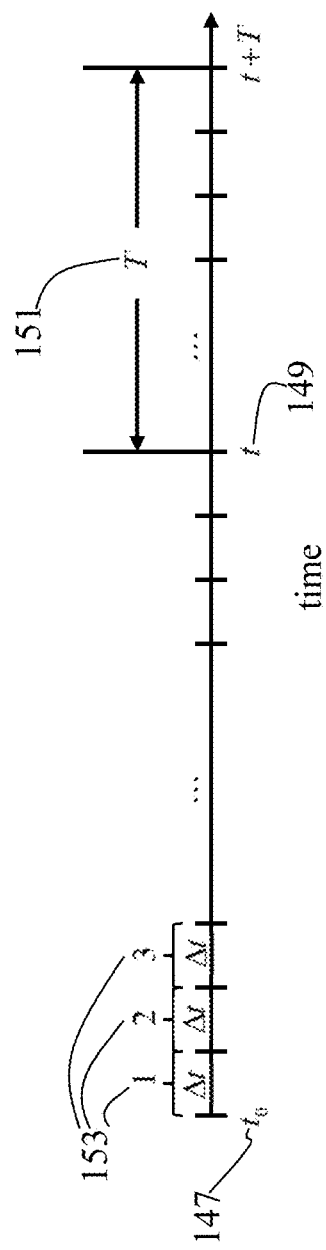
FIG. 1E illustrates a graph of quantization of elapsed time of a trajectory for destination prediction, according to an embodiment of the present disclosure.

FIG. 1E illustrates a graph of quantization of elapsed time of a trajectory for the destination prediction, according to an embodiment of the present disclosure.

An exemplary trajectory illustrated in the FIG. 1E has a starting time $t_0$ 147. The current time stamp is t 149, the quantization interval is $\Delta t$, and the prediction duration is T 151. The resulting tessellation indices of the elapsed time of the trajectory are indicated by 153. Let $t_m$ denote a tessellation index. In an example embodiment, for a given upper bound Q of elapsed times, the control system 101 may determine the tessellation index $t_m$ of the elapsed time for the current time stamp t 149 of a given tuple of positional coordinates in a given trajectory. Further, for the tessellation index $t_m$, a starting time stamp may be recorded as $t_0$ 147, by $$t_m = \left\lfloor \frac{t - t_0}{\Delta t} \right\rfloor + 1,$$

where quantization interval $$\Delta t = \frac{Q}{N_T},$$

where $N_T$ is an integer denoting the maximum tessellation index of the elapsed times. The $N_T$ could be taken reasonably large, as long as the computational resources permit. Further, $N_T$ could be determined by use of cross-validation, given a set of trajectories data.

Some embodiments take both positional information and timing information into account, to denote a trajectory as expressed in equation (1)

$$S=((p_1,t_1),(p_2,t_2),\ldots,(p_n,t_n)) \quad (1)$$

where n is the length of the trajectory, and the last tuple ($p_n$, $t_n$) might correspond to the destination, provided that the trajectory is complete. The processor 137 would only keep the tessellation indices themselves (without parentheses and commas) from the representation of the trajectory S in the equation (1).

In some embodiments, the tessellation indices may be represented using longitudes and latitudes. For example, for the tuple of coordinates ($x_l$, $y_l$), the tessellation index $p_{l1}$ (resp., $p_{l2}$) may be used for the longitude (resp., latitude), where the tessellation index $p_{l1}$ is determined as $p_{l1}=\tilde{x}+1$ (resp., $p_{l2}=\tilde{y}+1$).

Therefore, the same trajectory S may be represented as expressed by equation (2)

$$S=((p_{11},p_{12},t_1),(p_{21},p_{22},t_2),\ldots,(p_{n1},p_{n2},t_n)) \quad (2)$$

The processor 137 may only keep the tessellation indices themselves (without parentheses and commas) from the above trajectory representation of equation (2).

In some embodiments, the tuples of the tessellation indices composing a trajectory are mapped to new single symbols. Therefore, each trajectory of the partial trajectories 113 may be represented by a sequence of symbols, where each symbol is mapped from a tuple of the tessellation indices that indicates the positional information and the timing information. For example, the above trajectory S is represented as $S=q_1q_2\ldots q_n$. Since this representation shortened the original trajectory (hence, losing information when having the same number of trajectories), to achieve comparable generalization performance, a larger set of trajectories data may be required to train a predictive model comprised by the destination predictor 141.

Continuation Sets

In various embodiments, the scheduler 105 is configured to optimize a schedule of the bank of elevators to serve the current requests from passengers and future requests of the person for elevator service at the time intervals provided in the multinomial with probabilities of corresponding values in the multinomial determined for the tessellation element associated with the service area. In such a manner, the scheduler 105 is probabilistic scheduler that considers probabilities of future passengers' requests. Different embodiments use different implementations of probabilistic scheduler. However, considering future requests in probabilistic manner is challenging. To that end, some embodiments generate samples from the multinomial 111 to represent probabilities of future passengers' requests in deterministic manner simplifying the computation.

For example, one embodiment considers probabilities of future requests generated by the destination predictor 141 by generating continuation sets (or continuations 170) of current arrival stream, where the current arrival stream corresponds to the current passenger requests 119. In this embodiment, the scheduler 105 determines the schedule 107 based on the multinomial 111 that includes time information and destination information each associated with requests from one or more passengers. To that end, the scheduler 105 executes simulations (e.g. Monte Carlo simulation) and forms continuation sets that include current requests and the future requests each associated with service of the elevators.

In some embodiments, the continuation sets are formed through filtering values of multinomial 111 associated with the destinations by considering only areas of the floors 129a to 129f serviced by the bank of elevators 109. For instance, a dest2 out of destinations dest1, dest2, and dest3 in the multinomial 111 is an area which is only serviced by the bank of elevators 109. In such a case, the multinomial 111 is filtered such that information regarding only the dest2 in the multinomial 111 is considered to form the continuation sets and information regarding other destinations (i.e. the dest1 and dest3) which are not related to the area serviced by the bank of elevators 109 is discarded.

For instance, let H(t) be a set of passengers who have arrived by time t, but have not been served yet and are still waiting, W(H(t)) the cumulative waiting time of the passengers in H(t), $W_c(\cdot,\cdot)$ a function that expresses the waiting time of the one or more passengers given that another set of zero or more passengers are also assigned to the same car c. Further, let $H_c(t)$ be the set of passengers who are already assigned to car c by time t, but have not been served yet and are still waiting. Furthermore, a marginal increase in the waiting time for passenger h when assigned to car c is given by equation (3)

$$\Delta W_c(h)=W_c(H_c(t)\cup h|H_c(t)\cup h)-W_c(H_c(t)|H_c(t)). \quad (3)$$

The equation (3) may be further expanded as expressed in equation (4)

$$\Delta W_c(h)=W_c(h|H_c(t))+\Sigma_{g\in H_c(t)}[W_c(g|H_c(t)\cup h)-W_c(g|H_c(t))] \quad (4)$$

where,
the first term is the time needed to serve passenger h with car c, and
the remaining terms in the sum account for the increase in waiting time passenger h causes to the passengers already in the set $H_c(t)$, when also assigned to c.

A continuation set may be defined mathematically as represented in equation (5)

$$\check{H}_j(t)=\{h_1,h_2,\ldots,h_i,\check{h}_{j,i+1},\check{h}_{j,i+2},\ldots,\check{h}_{j,m_j}\}. \quad (5)$$

In some embodiments, M continuation sets $\check{H}_j(t)$, j=1, 2, ..., M may be generated, which might not necessarily have the same length, using the output of the destination predictor 141.

For each continuation set $\check{H}_j(t)$, an optimal Cumulative Waiting Time (CWT) is represented by equation (6)

$$W(\check{H}_j(t))=\Sigma_{c=1}^C W_c(\check{H}_{jc}(t)|\check{H}_{jc}(t))=\Sigma_{c=1}^C \Sigma_{h\in \check{H}_{jc}(t)} W_c(h|\check{H}_{jc}(t)), \quad (6)$$

where $\check{H}_{jc}(t)$ denotes the subset of continuation set $\check{H}_j(t)$ (of passengers) assigned to car c. The Average Waiting Time (AWT) for that assignment can be determined as $$\frac{1}{M}\sum_{j=1}^M \frac{W(\check{H}_j(t))}{m_j}. \quad (7)$$

In some embodiments, the duration of the n continuation sets can be adjusted according to the available computational resources. In all n continuation sets, the passengers $h_i$ with arrival times $t_i < t$ are assigned to the same elevator car in every continuation set. Outside of this consideration, any practical method for minimizing the AWT, e.g., an empty-the-system method, Immediate assignment and reassignment modes can be used.

Immediate Assignment

In this mode, the current passenger h is tentatively assigned 250 to car c with a marginal waiting time (MWT) 251

$$\Delta W_c(h) \dot= W_c(h|H_c(t)) + \Sigma_{g \in H_c(t)} [W_c(g|H_c(t) \cup h) - W_c(g|H_c(t))], \quad (4)$$

where g ranges over all passengers tentatively assigned to car c.

Note that future passengers are ignored in the first term. However, this assignment has an effect on the waiting time of future passengers $\tilde{h}_{j,i+k}$, when their marginal waiting times are determined as $$\Delta W_c(\tilde{h}_{j,i+k}) \dot= W_c(\tilde{h}_{j,i+k}|\tilde{H}_{jc}(t_{i+k-1})) + \Sigma_{g \in \tilde{H}_{jc}(t_{i+k-1})}[W_c(g|\tilde{H}_{jc}(t_{i+k-1}) \cup \tilde{h}_{j,i+k}) - W_c(g|\tilde{H}_{jc}(t_{i+k-1}))],$$

where $\hat{H}_{jc}(t_{i+k-1})$ denotes the set of future passengers that have arrived before time $t_{i+k}$, and have already been assigned to car c.

Then, the current passenger h is tentatively assigned to one of the continuation sets $\tilde{H}_{jc}(t_{i+k-1})$, and one can account for the mutual effects between known passenger h and the unknown future passenger $\tilde{h}_{j,i+k}$.

The immediate assignment mode has a relatively low complexity, compared to exhaustive searches, is linear in the number of future future arrivals, but does not necessarily determine the most optimal assignment for all passengers in the continuation set, because this mode only considers passengers that have arrived at times $t_{i+k}$ before assigning passenger $\tilde{h}_{j,i+k}$.

Immediate Assignment of the Current Passenger with Reassignment for Future Passengers.

The immediate assignment mode requires that the assignment for the current passenger is made immediately and never reconsidered. However, there is no such restriction of assignments for the future passengers. This makes it possible, at least in principle, to reconsider the assignment. However, this can lead to a significant increase in computation, and also might not correspond to the way scheduling is performed.

For instance, one of the n continuation sets actually occurs in the future, even though this is not very probable, but not impossible. In that case, the assignments for requests are performed in the immediate mode, and reassignment is not allowed. So, if a good partitioning has been determined in the reassignment mode, then it can be missed in the immediate assignment mode, and that is why reassignment should probably not be used when scheduling future passengers.

Reassignment Mode

When a computationally efficient procedure is available to determine the optimal assignment of an entire continuation set of passengers, it can also be effectively used for Monte Carlo evaluation on the expanded continuation sets $\tilde{H}_j(t)$ with an associated increase in the computational time.

Regardless of which mode is used, the Monte Carlo scheduling method operates in a rolling horizon manner After passenger $h_i$ has been assigned (temporarily or permanently) at time $t_i$, using the n sets $\tilde{H}_j(t_i)$, when the next passenger $h_{i+1}$ arrives at time $t_{i+1}$, new continuation sets $\tilde{H}_j(t_{i+1})$ are generated from an information vector $I(t_{i+1})$.

A number of options are possible for the format of the information vector $I(t)$ depending on the type of sensing information. A general format that can be used for generation of the Monte Carlo continuation sets is independent of the sensors 117. This format is a matrix of stochastic processes, specifying an arrival process for each pair of origin and destination floors.

Monte Carlo simulations are used to model the probability of different outcomes in a process that cannot easily be predicted due to the intervention of random variables. It is a technique used to understand the impact of risk and uncertainty in prediction and forecasting models. Some embodiments use the Monte Carlo simulations to represent probabilistic nature of future service request in a deterministic manner using the continuations set, in which each continuation set is deterministic, but collectively represent the probabilities of future requests at different time instances.

The Monte Carlo simulation may be a broad class of computational algorithms that rely on repeated random sampling to obtain numerical results. The underlying concept is to use randomness to solve problems that might be deterministic in principle. The Monte Carlo simulation may be used for generating draws from a probability distribution. The Monte Carlo simulation furnishes the decision maker with a range of possible outcomes and the probabilities that they may occur for any choice of action. The Monte Carlo simulation may show the extreme possibilities—the outcomes of going for broke and for the most conservative decision—along with all possible consequences for middle-of-the-road decisions. Further, the Monte Carlo simulation may perform risk analysis by building models of possible results by substituting a range of values—the probability distribution—for any factor that may have inherent uncertainty. The Monte Carlo simulation then calculates results over and over, each time using a different set of random values from the probability functions. Depending upon the number of uncertainties and the ranges specified for them, the Monte Carlo simulation may involve thousands or tens of thousands of recalculations before it is complete. Accordingly, the Monte Carlo simulation may produce distributions of possible outcome values.

In some embodiments, the control system 101 may performs the Monte Carlo simulation of the values of the multinomial 111 determined for the tessellation element associated with the area serviced by the bank of elevators 109 to produce multiple combinations of times of request. A frequency of occurrence of a specific time instance in the multiple combinations of times of request is a probability of future request for the elevator service at the specific time instance having a value in the multinomial 111 at an intersection of the specific time instance and the tessellation element associated with the area serviced by the bank of elevators 109. Further, the control system 101 may combine each of the multiple combinations of times of request with the current request to produce multiple continuation sets. Furthermore, the control system 101 may determine the schedule 107 of the bank of elevators 109 to optimize a metric of performance for at least some passengers in combination of all of the continuation sets. In an example embodiment, the control system 101 may use the Monte Carlo simulation to realize the continuation sets.

Figure 1F:
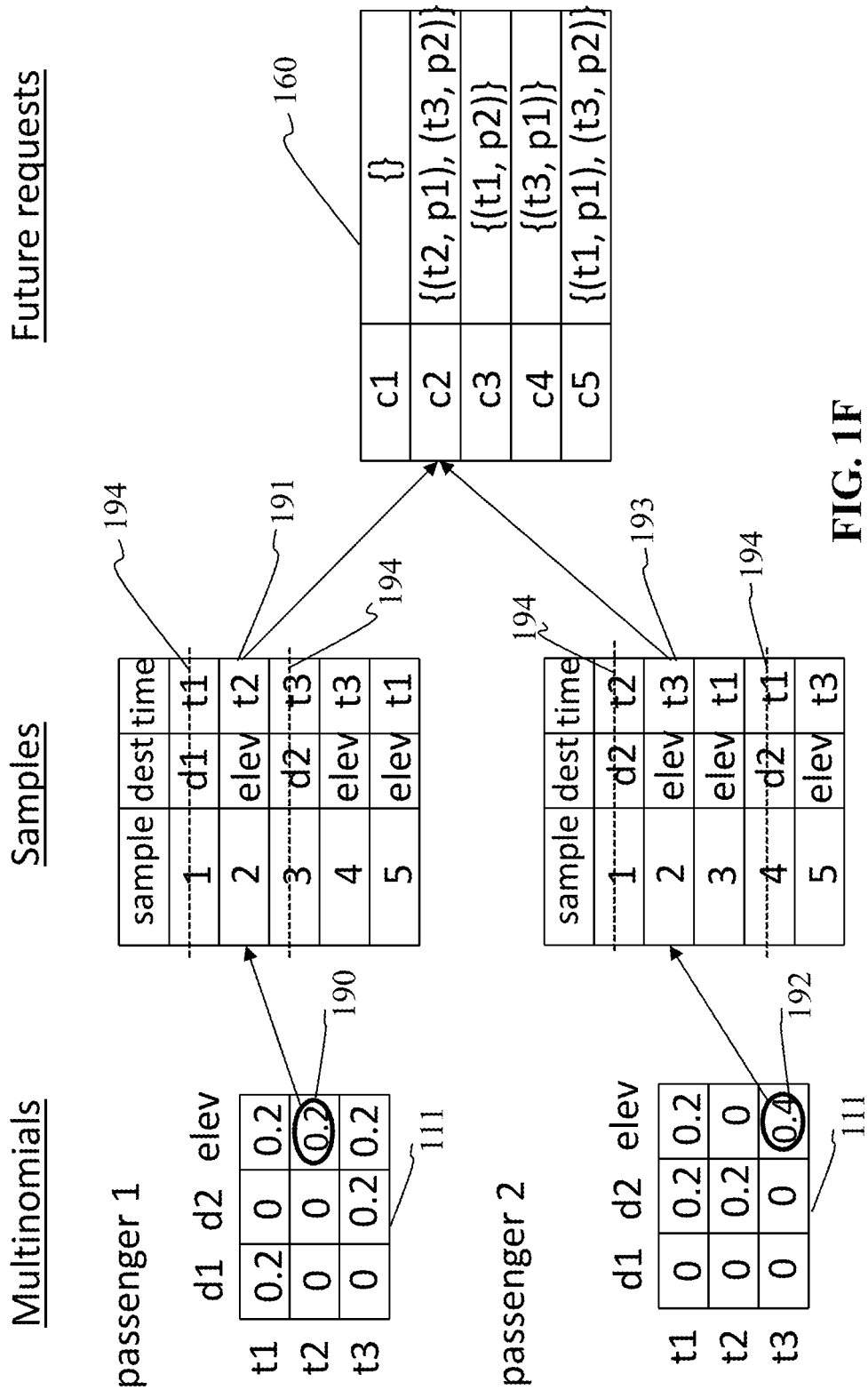
FIG. 1F illustrates Monte Carlo simulation for obtaining continuation sets based on the destination prediction, according to an embodiment of the present disclosure.

FIG. 1F demonstrates a schematic of a method for generating continuations based on multinomial 111 of passengers by using Monte Carlo simulation according to some embodiments. Consider two possible future passengers, each having a different multinomial (note that they could be on the same or different floors at the current time). Five samples are drawn from the multinomial for each possible future passenger, and that passenger is included in the future arrival list 160 for the respective continuation, if he/she is going to the elevator in the current sample. Note that, to reduce space (memory) expense, the drawn samples are filtered out 194 to keep only the samples where a passenger is going to the elevator, and all other samples are discarded. The sample 2 of passenger 1 corresponds to the circled value 190 in the multinomial of passenger 1, and the sample 2 of passenger 2 corresponds to the circled value 192 in the multinomial of passenger 2. Since both samples 191 and 193 have elevator as the destination, they are included in the future arrival list 160 for continuation set 2. This future arrival list 160 will be combined with the current arrival stream to produce a full set of continuations 170, as shown in FIG. 1G.

For example, the entry "(t2, p1)" in the continuation set c2 indicates that passenger 1 would arrive at the elevator at time t2 and make an elevator servicing request. If this happens to be a down-peak period, then "p1" could be further spelled out as the arrival floor being the floor where passenger 1 is currently on and the destination floor being 1 (i.e., the lobby). A further detailed example of forming the continuation sets is given below. In more general case, "p1" should be interpreted as the arrival floor and destination floor for passenger 1 accordingly, where the arrival floor is the floor passenger 1 is current on, and the destination floor could be determined by time periods, etc. The most general method for setting the destination floor would be randomly drawing it from a uniform distribution over the candidate destination floors; when using this method, additional continuation sets should be formed, to deal with the randomness. In another embodiment, if the identity of the passenger is known, and historical data about the floors this passenger has travelled to in the past is available, a probability distribution for the target floor can be learned from that data, and samples drawn from it when creating continuations.

Figure 1G:
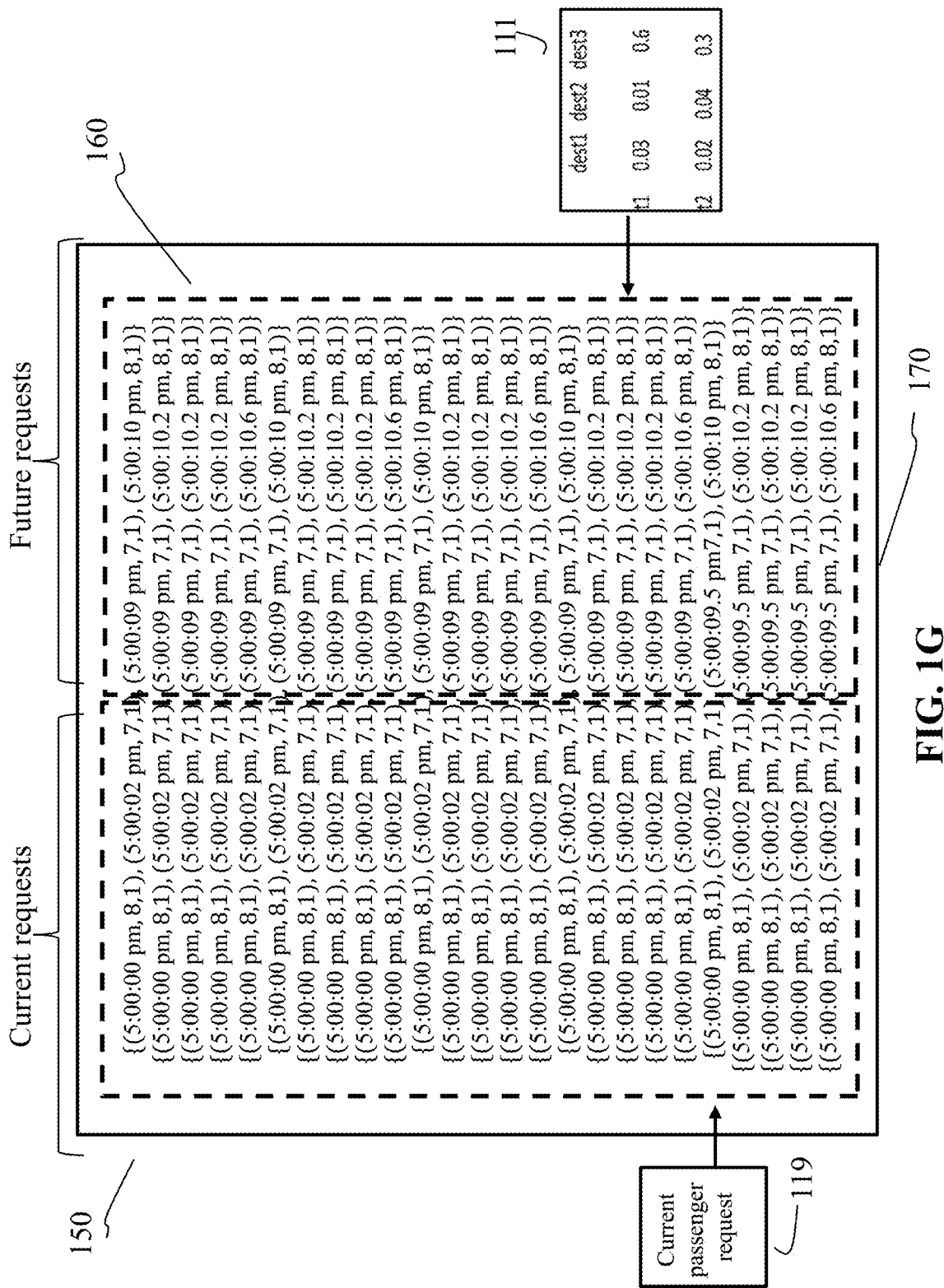
FIG. 1G illustrates exemplary representation of continuations sets based on the destination prediction, according to an example embodiment of the present disclosure.

FIG. 1G illustrates exemplary representation of continuations sets 170 based on the destination prediction, according to an example embodiment of the present disclosure.

In FIG. 1G, there are 25 continuations sets generated based on Monte Carlo simulation in accordance with the multinomial 111. Each continuation set 170 comprises combination of current requests 150 and future requests 160 (generated as shown in FIG. 1F) of the one or more passengers for service of the elevators in the bank of elevators 109. The current requests also include the current passenger request 119, along with all those passenger requests that have been registered by the GES, but have not been serviced yet. Note that for all 25 continuations, the current arrival stream 150 is exactly the same, whereas the future arrivals 160 differ for different continuations, in accordance with what kind of samples were drawn from the multinomial distributions of future passengers.

Each of the current requests 150 is associated with the current passenger request 119 and each of the future requests is associated with each time instance and destinations indicated by the multinomial 111, where the destination corresponds to each area of the set of floors 129a to 120f which is serviced by the bank of elevators 109. The areas of the set of floors 129a to 129f which are not serviced by the bank of elevators 109 is discarded from the consideration. Accordingly, more precise continuation sets having high probability of future requests are obtained. The continuation sets are exhaustive and comprises all possible outcomes of future requests. Such exhaustive continuation sets enable effective optimization of the AWT of all the passengers. Each continuation set of the continuation sets includes time information associated with current request as well as future request.

For instance, consider there is an eight-floor building and each floor (indicated by 1 through 8) has one elevator bank. The starting time is $t_0$=5:00:00 pm. The existing arrival stream is
{(5:00:00 pm, 8,1), (5:00:02 pm, 7,1)}.

With a quantization interval $\Delta t$=0.01 s for elapsed time and a prediction duration T=15 s, the future arrival information, extracted from the destination predictor 141, may indicate that on floor 7, passenger 1 will arrive at the elevator in 9 s (the tessellation index for elapsed time is 900) with probability 80%, and in 9.5 s (the tessellation index for elapsed time is 950) with probability 20%; on floor 8, passenger 2 will arrive at the elevator in 10 s (the tessellation index for elapsed time is 1000) with probability 20%, in 10.2 s (the tessellation index for elapsed time is 1020) with probability 60%, and in 10.6 s (the tessellation index for elapsed time is 1060) with probability 20%.

Further, each continuation set is deterministic in nature as the continuation sets represent the probabilities of future requests at different time instances. Accordingly, the control system 101 determines the schedule 107 via the scheduler 105 to control the bank of elevators 109 considering both the current and future service requests using the continuation sets.

Scheduling

Figure 1H:
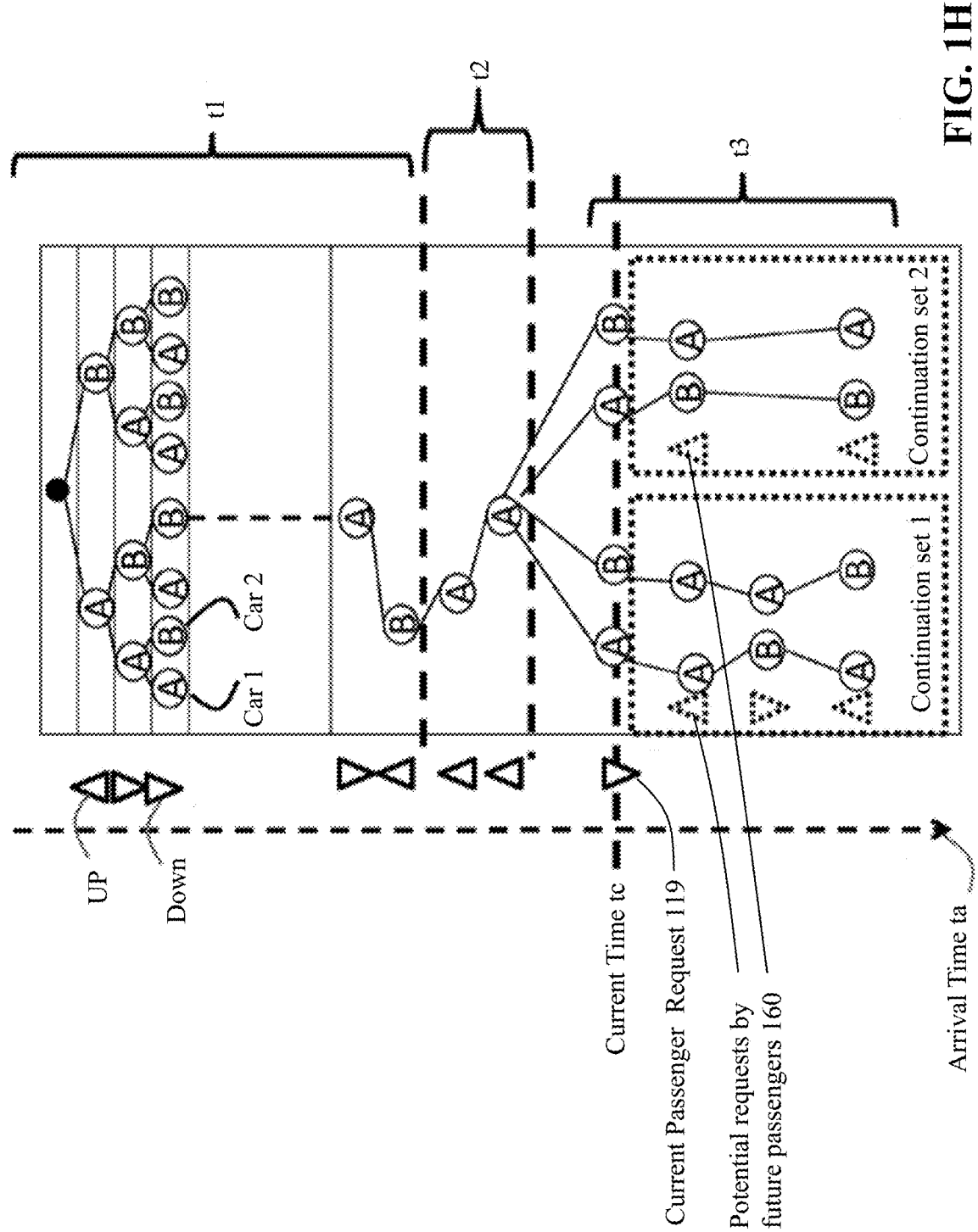
FIG. 1H illustrates a schematic of scheduling cars of the bank of elevators based on the continuation sets, according to an example embodiment of the present disclosure.

FIG. 1H illustrates a schematic of scheduling cars of the bank of elevators 109 based on the continuation sets, according to an example embodiment of the present disclosure.

In some embodiments, the destination predictor 141 may work with complete trajectories outside the bank of elevators 109. In other words, the destination predictor 141 is used for predicting arrival times at destinations with the elevator cars being of particular interest. In the most general case, once a passenger gets into an elevator car (the car 125 or the car 127), his/her destination floor may be any of the remaining floors (among the set of floors 129a to 129f) in the requested direction (e.g. UP or DOWN). Further, the expectation of the waiting time may be taken with respect to the uncertainty in the destination floors of passengers who are yet to be picked up by the elevator car. In some cases, during the up-peak or down-peak periods, the destination floors (from the set of floors 129a to 129f) of all passengers are uniquely designated. In response to receiving the requests, the scheduler 105 assigns an elevator car to each passenger in a manner that a performance metric is achieved, for example the average waiting time (AWT) for all passengers is minimized.

Some embodiments are based on the realization that the minimization of the AWT, for all the passengers that request elevator at a current time and during a future time interval, can be formulated as group elevator scheduling (GES) problem.

To facilitate traffic for the GES system, consider that $H=\{h_1, h_2, \ldots, h_J\}$ denotes a set of passengers arriving during an interval of time, where a passenger $h_i$ can be indicated by a tuple $(\tau_i, o_i, d_i)$, where $\tau_i$ is the arrival time, $o_i$ is the arrival floor, and $d_i$ is the destination floor.

Some embodiments are based on the realization that there are exponential (i.e., $C^J$) possible partitions of the set H into C subsets, and a suitable combinatorial optimization method is required to tackle the scheduling problem. In addition, a GES system has only limited access to arrival information, at a current time instance t satisfying $\tau_1 < t < \tau_J$, the GES system only has information regarding all service requests that occurred up to the current time t and the states of the C cars in the bank of elevators 109.

Based on such realization, it is an objective of the GES system is to optimize the schedule 107 to control the bank of elevators 109 by minimizing the AWT for all passengers that request elevator from a current time and a future time interval. To that end, the control system 101 may utilize the information of the continuation sets that includes an exhaustive list of the current requests and the future requests indicating information of each destination with a corresponding time instance.

For a set H of passengers $\{h_1, h_2, \ldots, h_N\}$ arriving during an interval of time, a passenger $h_i$ can be represented by a tuple $(t_i, o_i, d_i)$, where $t_i$ is the arrival time (i.e. the current time and the future time), $o_i$ is the arrival floor, and $d_i$ is the destination floor. An assignment of the N passengers to C cars in a bank partitions the set H into C subsets $H_c$, such that $H = H_1 \cup H_2 \cup \ldots \cup H_C$, and $H_i \cap H_j$ is the null set $\emptyset$ when $i \neq j$.

A waiting time for a passenger h in a set A assigned to a car c is $W_c(h|A)$ when all passengers in the set A are assigned to the car c. Similarly, a cumulative waiting time for all passengers in the set H is $W_c(H|A)$, when all of those passengers are assigned to car c. The sets H and A are not necessarily the same.

In general, the waiting time $W_c(H|A)$ depends on a predetermined order in which the car c services the passengers in the set $H \cup A$. Most elevator systems use a full collective policy where a car services all requests in one direction in sequence and then reverses and answers all calls in the opposite direction. When the car is empty and stopped, possible UP and DOWN directions are compared, and the one resulting in a shorter AWT is selected. Other possible service sequences that optimize the AWT are also possible. But regardless of the method selected, the resulting waiting time of $W_c(H|A)$ can be completely determined for a given combination of the sets H and A and the position of car c.

For a given full assignment, the total waiting time W(H) for all passengers in the set H can be expressed as $$W(H) = \sum_{c=1}^{C} W_c(H_c | H_c) = \sum_{c=1}^{C} \sum_{h \in H_c} W_c(h | H_c), \quad (1)$$

and the AWT of the passengers in the set H is W(H)|N. There are $C^N$ possible partitions of the set H into C subsets. With unlimited computational resources and/or a suitable combinatorial optimization method, the optimal assignment is determined.

Accordingly, the control system 101 optimizes the schedule 107 of the bank of elevators 109 to serve the current requests from the passengers and the future requests of persons after obtaining the continuation sets, for elevator service at the time instances provided in the multinomial 101 associated with the area serviced by the bank of elevators 109.

Based on the optimization of the schedule 107, the bank of elevators 109 is controlled. For instance, FIG. 1H shows that an arrival time to runs down and the time is partitioned into a time interval t1 for passengers whose requests have been served, a time interval t2 for passengers with assignments that have not yet been served, a current time tc, and a future time interval t3. The solid UP and DOWN symbols indicate current requests, and the dashed UP and DOWN symbols indicate future requests. Further, the letters A and B represent cars (car1 and car2). In the time interval t1 the consecutive choice of the cars is arranged as a decision tree. During the future time interval t3, the requests are fulfilled in the immediate assignment mode.

The AWT over all continuation sets is computed for each tentative assignment of the current passenger request (in this case, to either car1 or car2), and then the car choice with the shortest AWT is used to make the assignment for the current passenger request at the current time tc. In other words, the scheduler 105 compares how long the existing passenger and a set of possible future passengers would wait, across all cars available at the current point in time. The multiple number of continuation sets ensures that this calculation considers not only one, but many more possible future realizations of the passenger arrival stream. Accordingly, the cars (car1 and car2) of the bank of elevators 109 are scheduled in accordance with the optimization of the schedule 107.

Figure 2A:
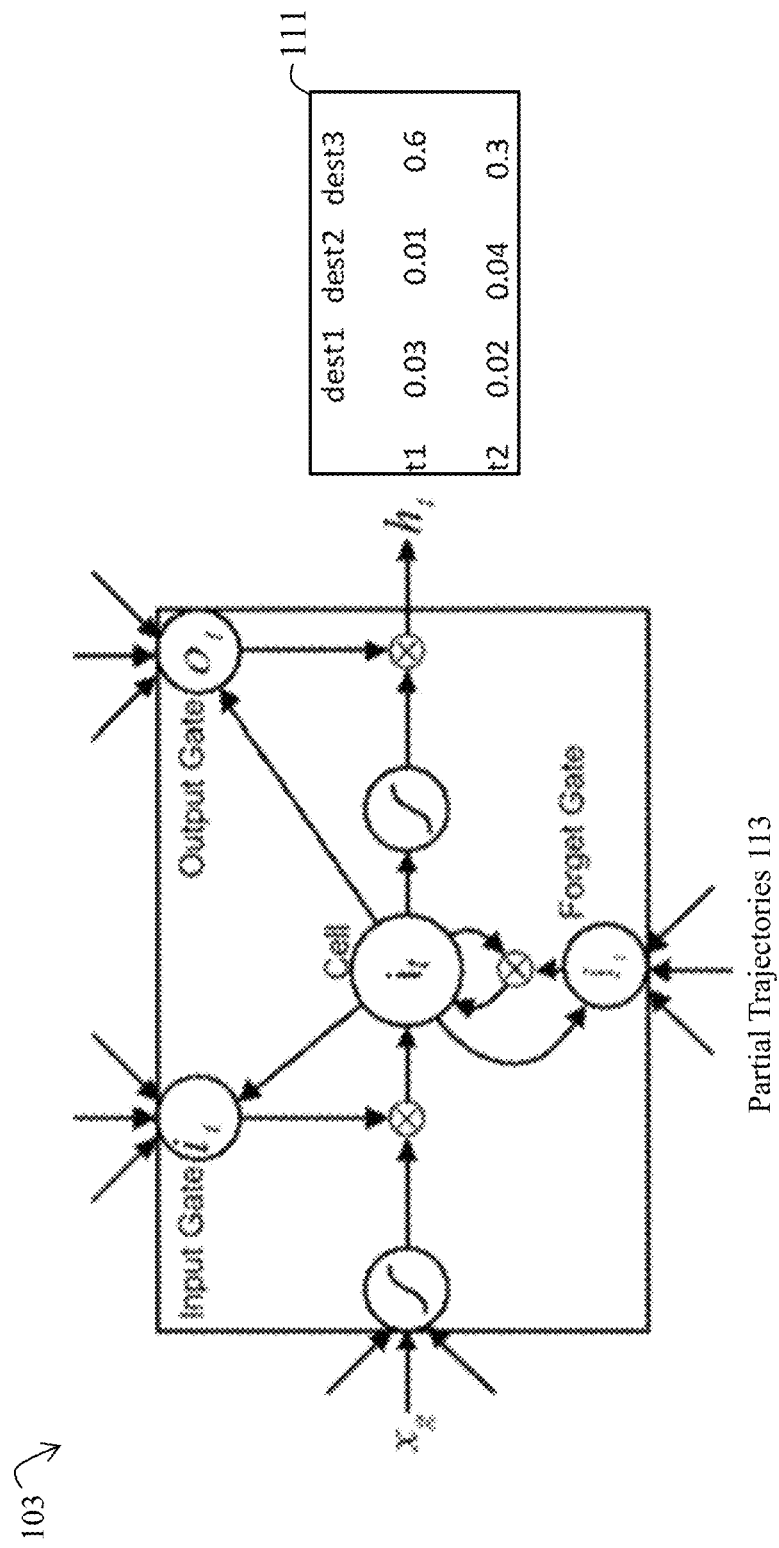
FIG. 2A illustrates a block diagram of the destination predictor, according to an embodiment of the present disclosure.

FIG. 2A illustrates a block diagram of the neural network 103, according to an example embodiment of the present disclosure. The destination predictor 141 may be implemented by the neural network 103 to predict the future requests of the one or more passengers. In some embodiments, the neural network 103 may be implemented based on model-based methods, where the model-based approaches encounter difficulties when dealing with long sequences of past observed data (e.g. the partial trajectories 113), as early information tends to dissipate when a long sequence is encountered.

Alternatively, in some other embodiments, the neural network 103 may be based on deep learning-based methods. Such embodiments are based on the realization that the deep learning-based methods are able to overcome natural language problems and also have an ability to be adapted to non-language applications, such as destination/trajectory prediction. Examples of deep learning-based neural networks include Recurrent Neural Networks (RNN), which work with variable length time sequence data, and the trajectories (that corresponds to time sequence data) can be predicted via RNNs to predict the future requests. Examples of the RNN may include, but are not limited to, Long short-term memory (LSTM) based neural network, Bidirectional long short-term memory (BiLSTM) based neural network, and the like.

In FIG. 2A, the neural network 103 is an LSTM based neural network that includes an input gate, a forget gate, and an output gate. Each of these gates corresponds to a "standard" neuron in a feed-forward (or multi-layer) neural network, that is, they compute an activation (using an activation function) of a weighted sum. Further, it, ot, and ft represent the activations of respectively the input, output and forget gates, at time step t. The 3 exit arrows from the memory cell c to the 3 gates i, o, and f represent peephole connections. These peephole connections denote the contributions of the activation of the memory cell c at time step t−1, i.e. the contribution of $c_{t-1}$. In other words, the gates i, o, and f calculate their activations at time step t (i.e., respectively, $i_t$, $o_t$, and $f_t$) also considering the activation of the memory cell c at time step t−1, i.e. $c_{t-1}$. The single left-to-right arrow exiting the memory cell c is not a peephole connection and denotes $c_t$, and a "x" symbol represent an element-wise multiplication between inputs. Further, the LSTM based neural network includes an application of a differentiable function (like the sigmoid function) to a weighted sum.

In operation, the forget gate receives the partial trajectories 113 detected by the sensors 117. The forget gate decides what information to throw away from input data (the partial trajectories 113), which may also be referred to as a cell state. For example, previous outputs and the new input may be passed through a sigmoid hidden layer. Each neuron in the hidden layer can compute the weighted sum of the input's entries (e.g., weighted by the relevant parameter), and add a bias value to it. The resulting scalar can then pass through a specific non-linear function named sigmoid, σ. The output of such process can then be set to the next step by the neuron. Output of the forget gate is provided to the input gate.

Further, the input gate decides what new information to store in the cell state. To that end, a previous output and a new input may be passed through a sigmoid hidden layer, and separately in some embodiments, the previous output and the new input may be passed through a hidden layer. These two distinct layers may only differ from one another in terms of the type of non-linear function that is applied to the output of the individual computation of each neuron (e.g., one is a sigmoid σ, the other is tan h). The state of the cell may be updated based on the output of the input gate.

Further, the output gate decides an output of the LSTM based neural network based on the updated cell state, the previous output, and the current input. Both the previous output and the new input may be passed through a sigmoid hidden layer. The results may be point-wise multiplied with the updated cell state vector Ct and the output is the resulting vector ht that corresponds to the multinomial 111. As the LSTM based neural network includes discarding information via the forget gate, the multinomial 111 may not be accurately obtained at the output.

Figure 2B:
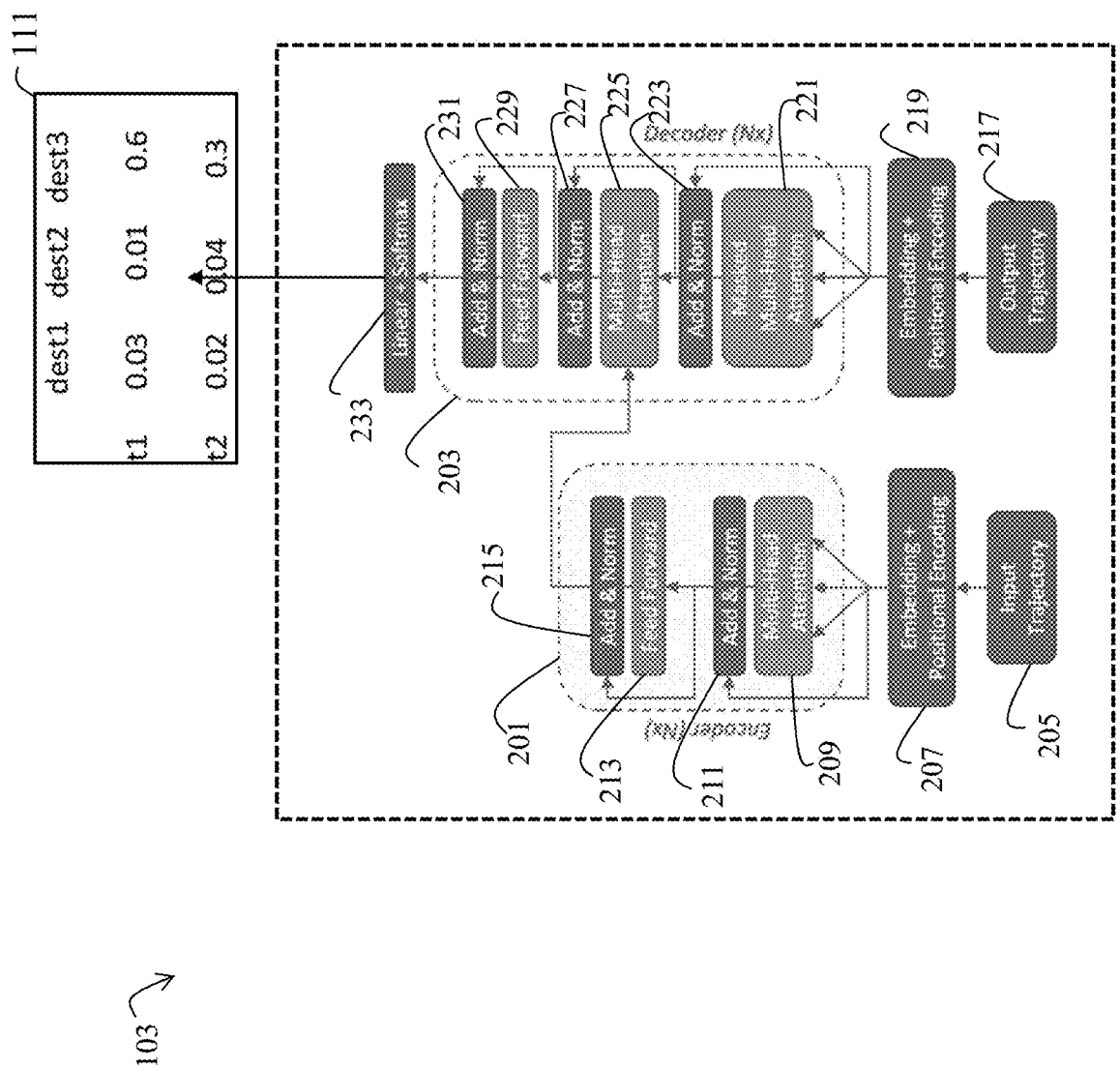
FIG. 2B illustrates a block diagram of the neural network, according to another example embodiment of the present disclosure.

FIG. 2B illustrates a block diagram of the neural network 103, according to another example embodiment of the present disclosure.

Some embodiments are based on the realization that an attention mechanism of transformer architecture enables modeling of dependencies of elements in a sequence without consideration of their distances such advantages of the transformer architecture are not limited to speech related application, and also true for the extended destination prediction tasks.

Accordingly, in such embodiments, the destination predictor 141 may be a solely attention-based destination predictor having an encoder-decoder structure. The attention-based destination predictor may be implemented using a transformer architecture based neural network. The destination predictor 141 may contain a stack of N encoder 201 blocks and N decoder 203 blocks. Further, the stack of each of the N encoder 201 blocks and the N decoder 203 blocks include stack of self-attention and fully connected feed forward layer components in such a way that the transformer architecture uses a positional encoding and an attention mechanism that enables parallelization.

As shown in FIG. 2B, initially, an input trajectory 205 passes through an embedding and positional encoding block 207 where input tokens may be converted to $d_{model}$-dimensional vectors by an embedding layer, where the tokens may be discrete elements. Further, order information about the elements of the input may be obtained using the positional encoding, and is then combined with the embedding vector to obtain a new vector via a summation operation. Further, the new vector may be passed into the encoder 20 through a multi-head attention block 209. Attention in the encoder 201 may be used as a means for referencing other tokens in the input trajectory 205 when attempting to encode a specific token.

The multi-head attention block 209 may consist of an array of scaled-dot product attention components, where an attention function may be calculated based on a data matrix X. The data matrix may be projected using three different matrices that are learned in training, and projected matrices Q, K, and V are obtained which represent queries, keys, and values, respectively.

In some embodiments, the attention may be then calculated as:

$$\text{Attention}(Q,K,V)=\text{softmax}(QK^T/\sqrt{d_k})\times V \quad (8)$$

where $d_k$ is the number of columns of the K matrix.

In some embodiments, multi-head attention mechanism involves calculating multiple attention functions with different learned projections in order to yield improved representation performance.

Further, an addition and normalization block 211 in the encoder 201 may comprise residual connection along with a Layer Normalization (RLN) which may connect an input to the multi-head attention block 209 with an output of the multi-head attention block 209, add them, and then normalize. The resulting elements may further pass through a feed forward sublayer 213 followed by another addition and normalization block 215 comprising RLN connection on its way out of the encoder 201. The addition and normalization block 215 may connect the input to feed forward layer 213 with output of the feed forward layer 213, add them, and then normalize.

Further, a target output trajectory 217 may pass through embedding and positional encoding blocks 219, which may be similar to embedding and positional encoding block 207, before entering a masked multi-head attention block 221. The masked multi-head attention block 221 element may be similar to the multi-head attention block 209 of the encoder 201 except that the output trajectory 217 is masked such that the masked multi-head attention block 221 may only refer to preceding output trajectory positions. Further, an addition and normalization block 223 comprising residual connection along with a Layer Normalization (RLN) may connect the input to the masked multi-head attention block 221 with output of the masked multi-head attention block 221, add them, and then normalize.

After the addition and normalization block 223, another multi-head attention block 225 may exist which may be similar to the multi-head attention block 209 of the encoder 201 except that the multi-head attention block 225 uses information from the encoder output as additional input in calculation of attention.

Further, another addition and normalization block 227 may connect the input to the multi-head attention block 225 with output of the multi-head attention block 225, add them, and then normalize. The resulting elements may further pass through a feed forward sublayer 229 followed by another addition and normalization block 231 on its way out of the decoder 203. The addition and normalization block 231 may connect the input to feed forward layer 229 with output of the feed forward layer 229, add them, and then normalize.

Outside of the decoder 203, a linear layer and softmax block 233 may exist that may take the output of the decoder 203 and create a logic vector over all possible output elements. Further, the linear layer and softmax block 233 may perform a softmax operation to convert the values in the logic vectors to output that multinomial 111 which indicates probabilities including the predicted arrival information. From the multinomial 111, the maximum value and its index can be extracted to locate a predicted destination, or generation multiple realizations, such as continuations of an existing arrival stream, of the arrival times with the elevator cars (e.g. the car 125 or the car 127) on a specific floor or multiple floors, from the set of floors 129a to 129f) as one or more destinations. In an example embodiment, when training the destination predictor 141 as transformer based destination predictor, a KL Divergence loss function may be minimized over multiple epochs, and a greedy decoding scheme may be used as a method for finding the output destination.

Accordingly, unlike the RNNs that deal with sequences in a sequential manner which can inhibit parallelization within training, the transformer architecture uses positional encoding and attention modules for parallelization and, in turn, a more efficient training procedure. Due to parallelization, the transformer architecture based neural network is configured to process data at high processing speed and is preferred neural network architecture.

Training

In an example embodiment, the destination predictor 141 based on transformer architecture may include N=4 encoder/decoder blocks along with 4 level stacked Long short-term memory (LSTM)/bidirectional Long short-term memory (BiLSTM) models.

For training the destination predictor 141 based on the transformer architecture, real and/or simulated indoor movements are used by different embodiments. For example, SimTread simulation software may be used to generate movement trajectories in an indoor setting based on created floor architecture. Additionally, or alternatively, in one embodiment, the initially trained neural network 103 based on simulated data is further trained online during its operation based on actual measurements of the partial trajectory and final destinations. When the training dataset contains a small number of trajectories, the Leave-One-Out Cross-Validation (LOOCV) technique for obtaining average performance may result for rested prediction models.

Further, for given S total samples (trajectories), S iterations may be carried out, where in each iteration, one of the S trajectories may be used for model testing and the remaining S−1 trajectories for model training Per iteration, an array of correct destination probabilities may be obtained by increasing the percentage of query test trajectory. Such probability arrays may be averaged over all S iterations to obtain average destination prediction performance for a given model.

In some embodiments, to obtain the continuation sets, the destination predictor 141 may be trained on training trajectories. Let $S^{(\xi)}=((p_1^{(\xi)}, t_1^{(\xi)}), (p_2^{(\xi)}, t_2^{(\xi)}), \ldots, (p_{n_\xi}^{(\xi)}, t_{n_\xi}^{(\xi)}))$ be the $\xi$th training trajectory, where $(p_\kappa^{(\xi)}, t_\kappa^{(\xi)})$ is a tuple with $p_\kappa^{(\xi)}$ (resp., $t_\kappa^{(\xi)}$) denoting the tessellation index of the position (resp., elapsed time) for the $\kappa$th recording of the trajectory $S^{(\xi)}$, and the last tuple $(p_{n_\xi}^{(\xi)}, t_{n_\xi}^{(\xi)})$ denotes the tessellation indices of the position and elapsed time at the destination, $\forall \kappa=1, \ldots, n_\xi, \xi=1, \ldots, N_{train}$. The set of training trajectories $\{S^{(\xi)}; \xi=1, \ldots, N_{train}\}$ may be taken from historical recordings (i.e. historical trajectories) extracted from sensors 117. The trained destination predictor 141 may use the generated continuation sets to determine the schedule 107.

The control system 101 may further include a period of prediction or prediction duration T that denotes the length of the time interval for potential future arrivals for the generation of continuations. The T may be selected either smaller or larger, depending on the availability of computational resources. On each floor of the set of floors 129a to 129f, let the sensors 117 monitor all pedestrian movements up to the current time t, and let the processor 137 identify a set of partial trajectories (e.g. the partial trajectories 113) of candidate future arrivals within time interval [t, t+T].

Let $\check{S}^{(\zeta)}=((\check{p}_1^{(\zeta)}, \check{t}_1^{(\zeta)}), (\check{p}_2^{(\zeta)}, \check{t}_2^{(\zeta)}), \ldots, (\check{p}_{n_\zeta}^{(\zeta)}, \check{t}_{n_\zeta}^{(\zeta)}))$ denote the $\zeta$th such partial trajectory, where $(\check{p}_l^{(\zeta)}, \check{t}_l^{(\zeta)})$ is a tuple with $\check{p}_l^{(\zeta)}$ (resp., $\check{t}_l^{(\zeta)}$) denoting the tessellation index of the position (resp., elapsed time) for the Lth recording of the trajectory $\check{S}^{(\zeta)}, \forall \iota=1, \ldots, n_\zeta, \zeta=1, \ldots, N_{test}$. Depending on the available partial trajectory information, the last tuple $(\check{p}_{n_\zeta}^{(\zeta)}, \check{t}_{n_\zeta}^{(\zeta)})$ could be farther or closer to the tuple of tessellation indices of the position and elapsed time at the final destination.

Further, denoting the starting time of $\check{S}^{(\zeta)}$ as $\check{t}_0^{(\zeta)}$ and the predicted arrival time as $\check{t}^{(\zeta)}$, then $\check{S}_0^{(\zeta)}+\check{t}_{n_\zeta}^{(\zeta)}\Delta t \leq t \leq \check{t}^{(\zeta)} \leq t+T$. For a given input partial trajectory $\check{S}^{(\zeta)}$, the actual output of the destination predictor 141 is a probability distribution $P^{(\zeta)}(\omega)$ over the set $\Omega$ of all candidate tuples of tessellation indices of positions and elapsed times. Let $\Omega'$ denote a subset of $\Omega$ representing tuples of tessellation indices of positions and candidate elapsed times corresponding to the elevator doors on of elevator cars on a corresponding floor. Further, a set of probabilities $\{P^{(\zeta)}(\omega); \omega \in \Omega'\}$ for the subset $\Omega'$ may be extracted to generate the continuation sets. Based on predictions for the trajectory $\check{S}^{(\zeta)}$, different continuations of the arrival stream can then be formed using the probabilistic information in $\{P^{(\zeta)}(\omega); \omega \in \Omega'\}$ by means of Monte Carlo simulation. A complete continuation set and further multiple continuation sets are then obtained by taking predictive information of all available partial trajectories 113 $\{\check{S}^{(\zeta)}, \zeta=1, \ldots, N_{test}\}$ into account.

In some embodiments, the neural network 103 (the LSTM based neural network, the transformer architecture based neural network, and the like) in the control system 101 may be trained online. In some other embodiments, the neural network 103 (the LSTM based neural network, the transformer architecture based neural network, and the like) in the control system 101 may be trained offline (pre-trained). In some other embodiments, the neural network 103 (the LSTM based neural network, the transformer architecture based neural network, and the like) in the control system may be partially trained offline and partially trained online.

Figure 2C:
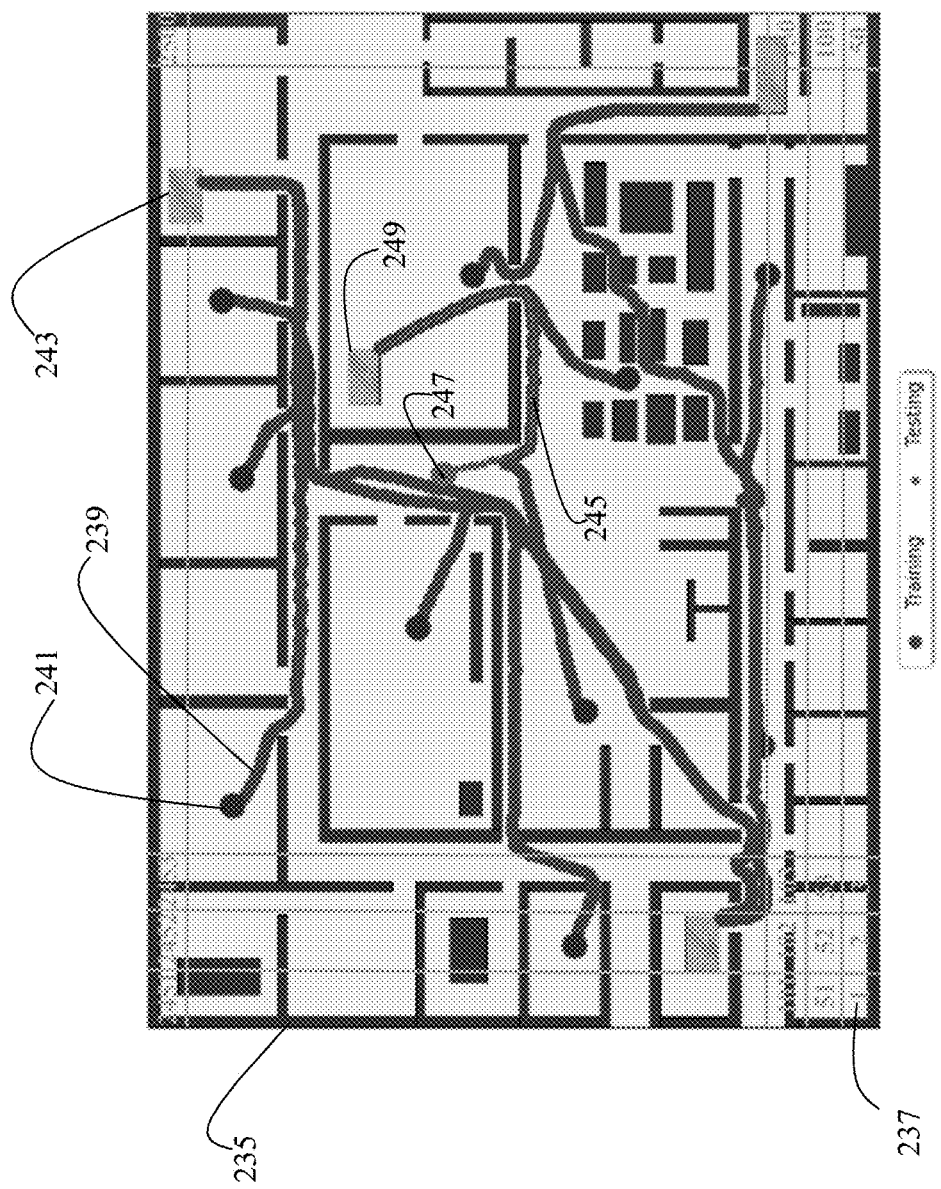
FIG. 2C illustrates a layout of a floor in a building with multiple trajectories of pedestrians for training and one partial trajectory of a pedestrian for testing of the destination predictor, according to an embodiment of the present disclosure.

FIG. 2C illustrates a layout of a floor in a building with multiple trajectories of pedestrians for training and one partial trajectory of a pedestrian for testing of the destination predictor 141, according to an embodiment of the present disclosure.

In some embodiments, the partial trajectories 113 may comprise trajectories containing only positional information, where each trajectory may be represented by a sequence of tessellation indices. The tessellation indices may be obtained by discretizing a range of positional co-ordinates, where the range of positional co-ordinates may represent longitudes and latitudes associated with the tessellation elements corresponding to the floor. In another embodiment, the partial trajectories 113 may comprise trajectories containing both positional information and timing information. Further, each trajectory may be represented by a sequence of tuples of tessellation indices, where each tuple may contain tessellation indices obtained by discretizing a range of positional co-ordinates and a period of prediction. The period of prediction may be a maximum time considered by the control system 101 for the future requests of passengers.

As shown in the FIG. 2C, the coordinates of positions on a floor 235 are discretized into tessellation indices 237, thus simplifying representations of trajectories. The continuous space of the floor 235 is discretized into a 50×50 tessellation and each trajectory is converted into a sequence of tessellation locations that serve as input to the transformer architecture. Overall, this data may serve to mimic a single user's movement throughout a floor during a time period of a day where the visited destinations may represent mostly accessed real-life indoor destinations such as bathrooms, stairs, elevators, and break rooms. Each training trajectory 239 (i.e. historical trajectory) may have its own starting point 241 and finalized destination 243, and each testing trajectory 245 (i.e. new trajectory) may have its own starting point 247, but the testing trajectory 245 does not have a finalized destination 249 yet, which is to be predicted by the destination predictor 141 of the control system 101. The destination predictor 141 trained with the training trajectories 239 may accurately predict possible destinations of the person and time of arrivals of the person at the corresponding destinations based on the partial trajectory of the person.

In an example embodiment, in a multiple-floor building, each floor may have its own layout and destination predictor 141. In another embodiment, the destination predictor 141 may also be built across multiple floors, as long as the partial trajectories 113 are outside the elevator cars (e.g., the car 125 and the car 127). In addition, when generating the continuation sets from the multinomial 111 that indicates predicted arrival information of potential passengers, a parallel helper taking account of the periods of the day may be incorporated. For example, during the down-peak period of a workday, the destination floor of a typical passenger is taken as the lobby, rather than all the remaining floors with equal probabilities.

Further, training the destination predictor 141 to output prediction estimation in a form of multinomial may have a number of advantages. First, the multinomial may replace an individual prediction of a probability of arrival to an elevator request area with a joint prediction of arrival at any destination where the elevator request area is one of the destinations. Hence, a probability of arriving at the elevator request area is determined with respect to other destinations when two conditions are satisfied.

The two conditions may include the list of destinations being exhaustive and the sum of all values in the multinomial equal to '1'. The first requirement is satisfied by space quantization and the second requirement is enforced during the training of the neural network 103 including the destination predictor 141. In such a manner, the extended destination prediction of probability of arrival at an elevator request area may be simplified.

Figure 2D:
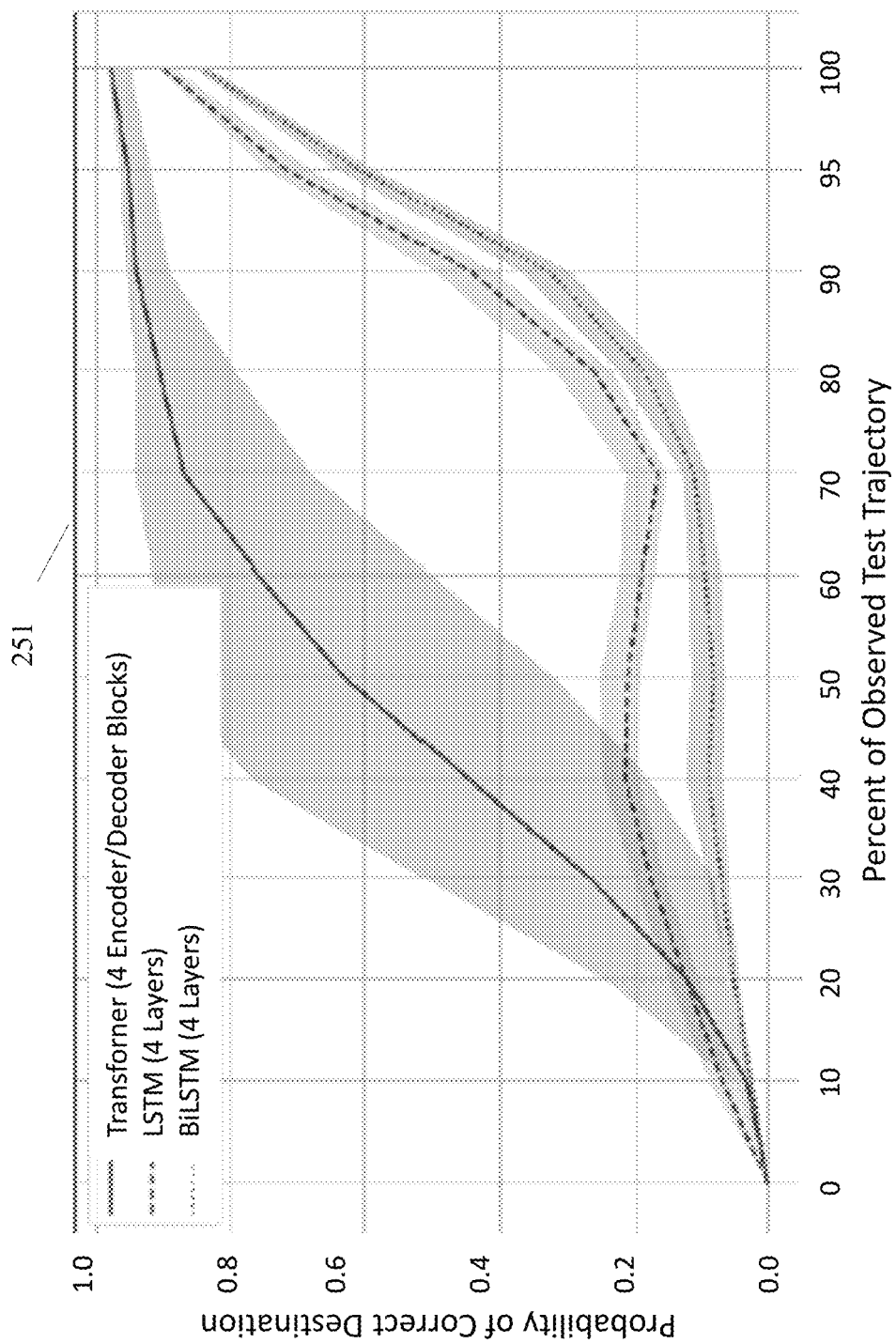
FIG. 2D illustrates a plot of comparison of probability of destination prediction determined by a transformer architecture based neural network, Long short-term memory (LSTM) based neural network, and Bi-direction long short-term memory (BiLSTM) based neural network, according to an example embodiment of the present disclosure.

FIG. 2D illustrates a plot 251 of comparison of probability of destination prediction determined by the transformer architecture based neural network, Long short-term memory (LSTM) based neural network, and Bidirectional long short-term memory (BiLSTM) based neural network, according to an example embodiment of the present disclosure.

The plot 251 comprises percentages of observed test trajectory plotted on X axis and probabilities of correct destination plotted on Y axis. The plot 251 considers the median performances along with nearby quantile behaviour. The plot 251 shows the 40th, 50th, and 60th quantile of destination probabilities to measure variability in test trajectory complexity. When carrying out the Leave One Out Cross Validation (LOOCV) approach, test trajectories of varying lengths and similarities to the training trajectories may be encountered. Further, the destination probabilities that are obtained over some splits may differ and a robust destination prediction model should be able to recognize the differences in the trajectories and adapt its predictions accordingly, as can be seen with a larger spread in prediction probabilities.

Further, the plot 251 shows that the transformer architecture based neural network can yield an improved destination prediction early in the development of a trajectory, unlike the LSTM based neural network and BiLSTM based neural network that require more observation to make accurate predictions. In addition, the variations in correct class probabilities for the transformer architecture neural network show improved accuracies over the baseline methods.

Figure 2E:
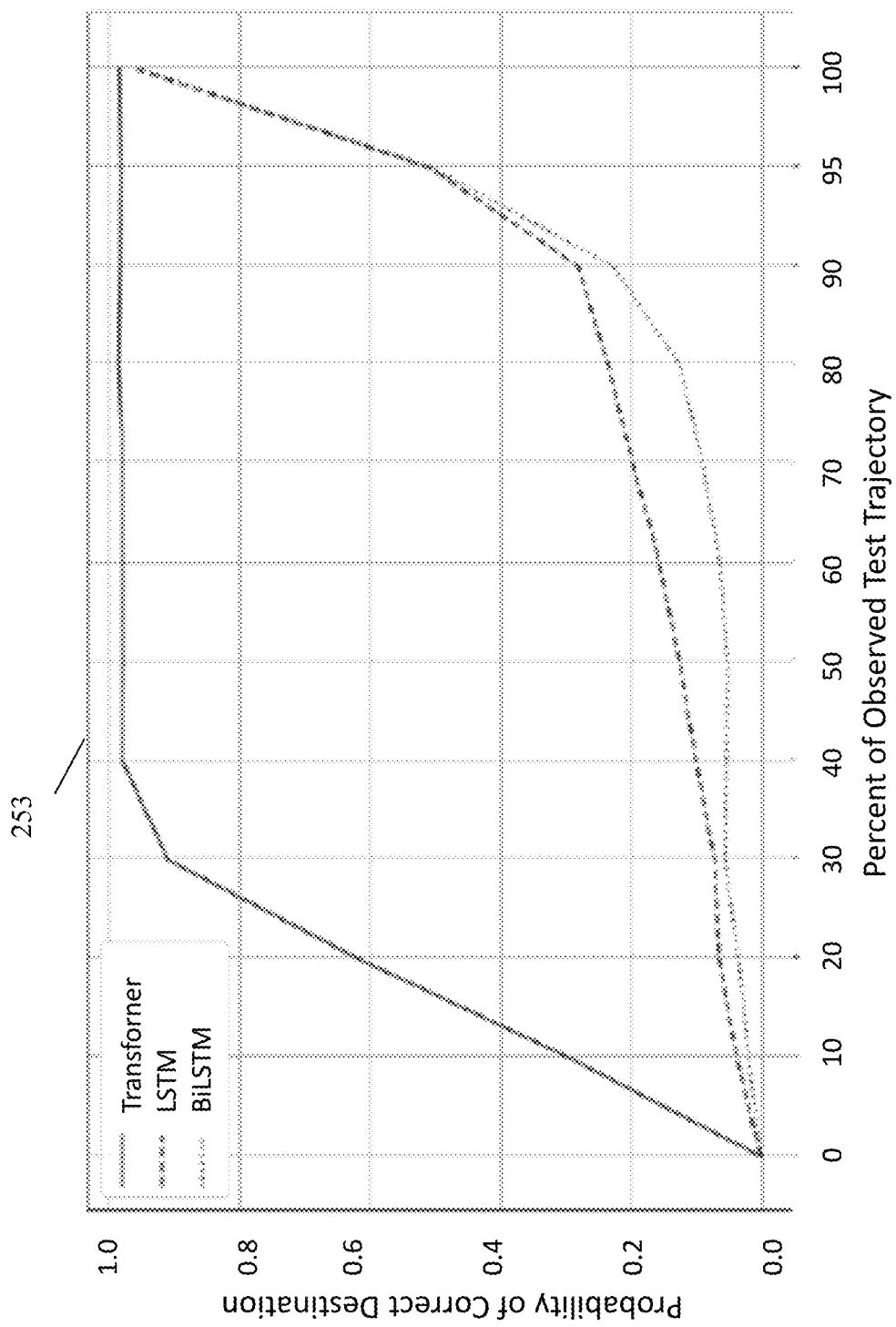
FIG. 2E illustrates a plot of comparison of probability of destination prediction determined by the transformer architecture based neural network, LSTM based neural network, and BiLSTM based neural network, according to another example embodiment of the present disclosure.

FIG. 2E illustrates a plot 253 of comparison of probability of destination prediction determined by the transformer architecture based neural network, LSTM based neural network, and BiLSTM based neural network, according to an example embodiment of the present disclosure.

The plot 253 corresponds to the probability of the destination prediction when a true test trajectory destination probability is a function of a percentage of observed test trajectory. The plot 253 comprises percentages of the observed test trajectory plotted on X axis and probabilities of correct destination plotted on Y axis. The plot 253 considers one split of the LOOCV approach as shown in FIG. 2E. In this case, the test trajectory begins to overlap with some training trajectories early in its development. This overlap provides helpful information regarding a destination and may be recognized and exploited by a prediction model. An ideal model would detect the early overlap and would account for this by increasing the true destination probability at around the 20% mark of the test trajectory.

Thus, these results show that the transformer architecture based neural network is able to learn patterns in this simplistic, low-data setting as evidenced by its increasing destination probabilities, unlike the LSTM based neural network and BiLSTM based neural network that are unable to detect destinations correctly early in the development of a movement trajectory.

Figure 3:
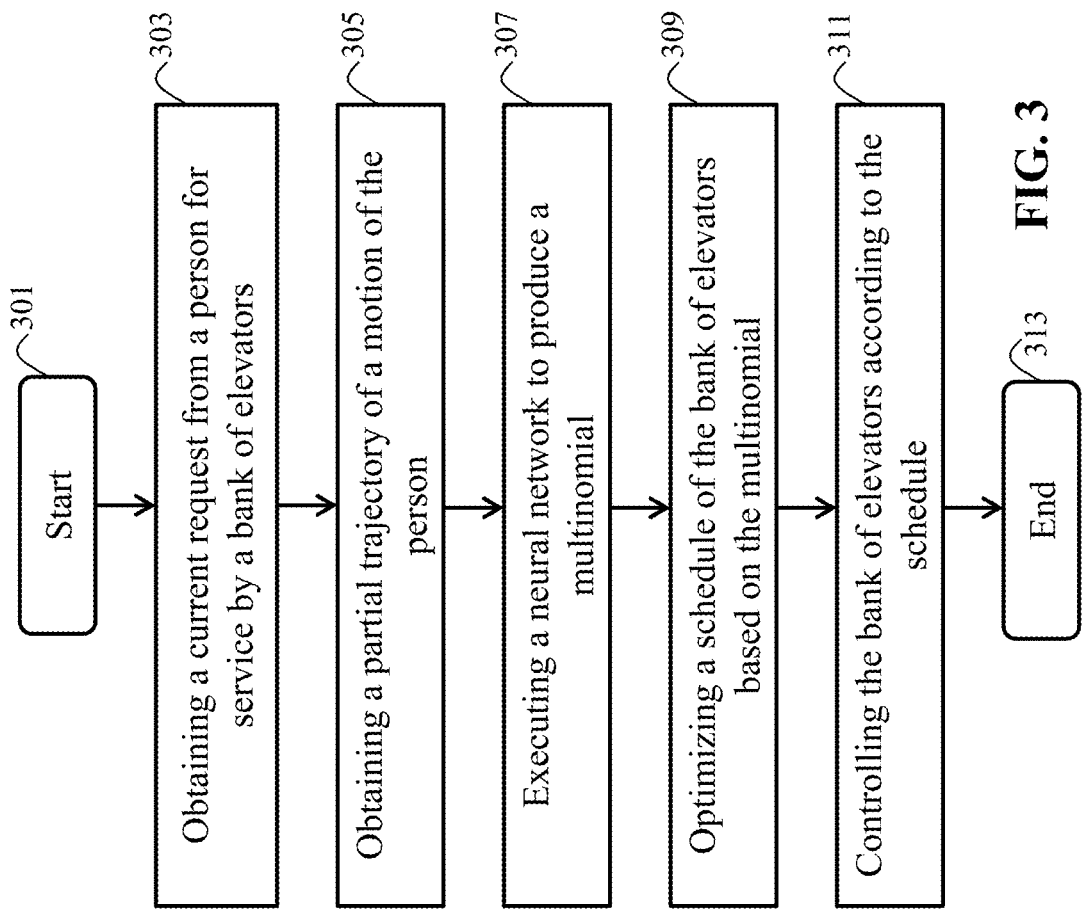
FIG. 3 illustrates steps of a method implemented for controlling motion of the bank of elevators, according to some embodiments of the present disclosure.

FIG. 3 illustrates steps of a method implemented for controlling motion of the bank of elevators 109, according to some embodiments of the present disclosure. The method may be executed by components of the control system 101.

The method starts at step 301. At step 303, a current request from a person for service by the bank of elevators 109 may be obtained. The current request may be obtained from the person via the first input interface.

At step 305, a partial trajectory of a motion of the person may be obtained. The partial trajectory of the person moving on a floor (for example, a floor 129a) that comprises an area serviced by the bank of elevators 109 may be obtained from a second input interface 133, where the second input interface 133 may comprise various motion sensors.

At step 307, upon reception of the partial trajectory of the motion of the person, a neural network 103 trained for an extended destination prediction of the person having the motion according to the partial trajectory, may be executed to produce a multinomial (e.g. the multinomial 111) of the extended destination prediction for the person.

At step 309, a schedule 107 of the bank of elevators 109, to serve the current request from the person and future requests of the person, may be optimized. The schedule 107 may be optimized by providing elevator service at the time instances provided in the multinomial with probabilities of corresponding values in the multinomial determined for a tessellation element associated with the area serviced by the bank of elevators 109.

At step 311, the bank of elevators 109 may be controlled according to the schedule 107. The schedule 107 ensures that an average waiting time (AWT) for all the passengers is minimized. The method ends at step 313.

Figure 4:
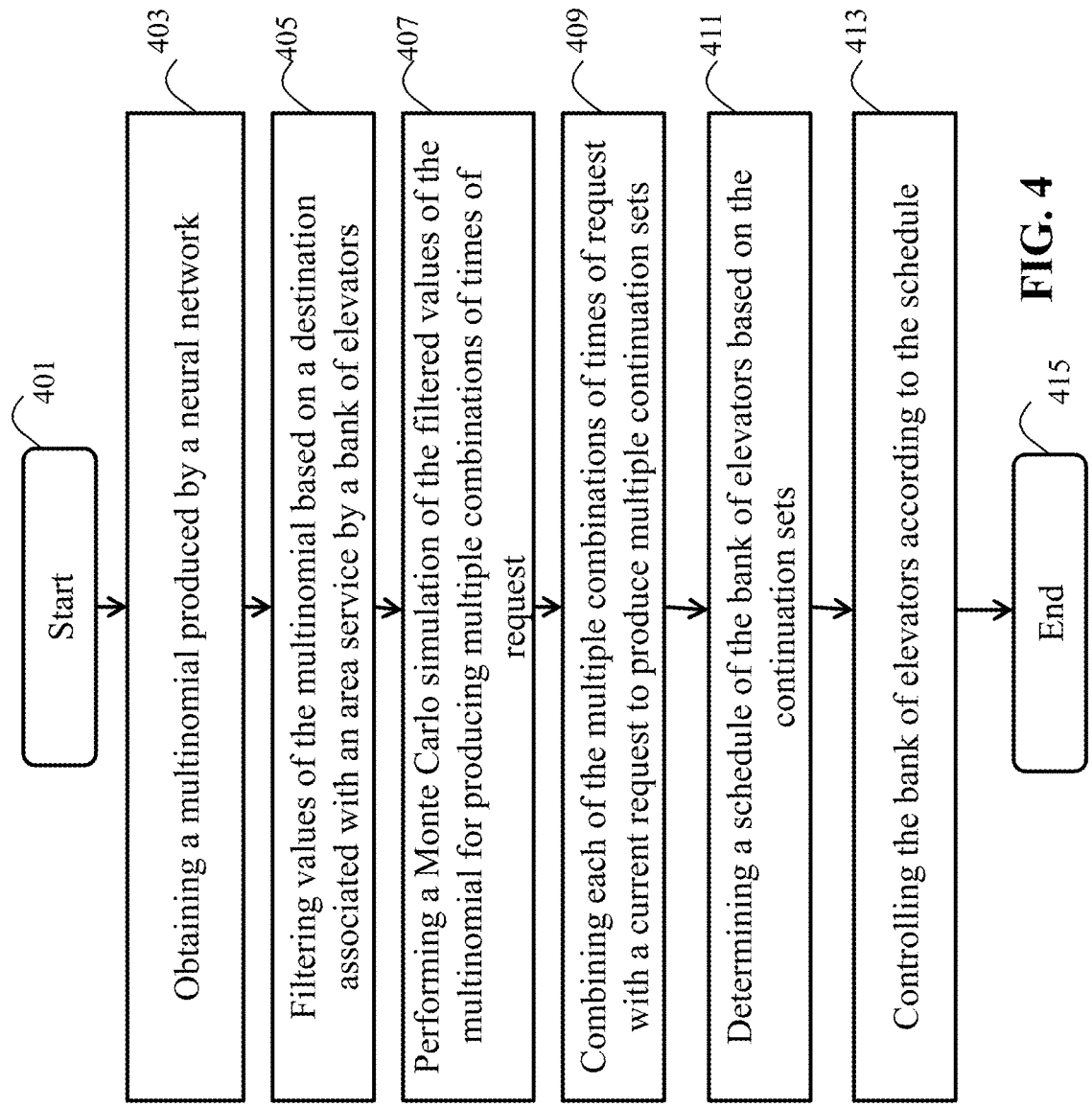
FIG. 4 illustrates steps of a method implemented for Monte Carlo simulation for determining a schedule for controlling motion of the bank of elevators, according to some embodiments of the present disclosure.

FIG. 4 illustrates steps of a method implemented for Monte Carlo simulation for determining a schedule for controlling motion of the bank of elevators 109, according to some embodiments of the present disclosure. The method may be executed by the components of the control system 101.

The method starts at step 401. At step 403, the multinomial 111 may be obtained which is produced by the neural network 103. The multinomial 111 has at least two dimensions including a first dimension of destinations of the person and a second dimension of time instances of the person arriving at the destinations of the first dimension, where a floor is quantized into tessellation elements forming the destinations of the first dimension and at least one tessellation element is associated with the area serviced by the bank of elevators 109.

At step 405, values of the multinomial 11 may be filtered based on a destination associated with the area service by the bank of elevators 109. In such a manner, other destinations, indicated in the multinomial 111, which are not related to the area serviced by the bank of elevators 109 may be discarded to provide accurate destination prediction.

At step 407, a Monte Carlo simulation of the filtered values of the multinomial 111 may be performed for producing multiple combinations of times of request. A frequency of occurrence of a specific time instance in the multiple combinations of times of request is a probability of future request for the elevator service at the specific time instance having a value in the multinomial at an intersection of the specific time instance and the tessellation element associated with the area serviced by the bank of elevators 109.

In an alternative embodiment, this step is omitted, because the samples in the previous step already include the time of arrivals. Some other embodiments, select this step in dependence on how the sampling is done. One approach picks a cell of the multinomial according to a probability equal to the value in the cell. Because each cell corresponds to a combination of a destination and time, the time component will already be present in the sample.

At step 409, each of the multiple combinations of times of request with the current request may be combined to produce multiple continuation sets. In some embodiments, the continuation sets are formed through filtering destinations by considering only the area serviced by the bank of elevators 109.

At step 411, a schedule (e.g. the schedule 107) of the bank of elevators 109 may be determined, where the schedule 107 is determined to optimize a metric of performance for at least some passengers in combination of all of the continuation sets.

At step 413, the bank of elevators 109 may be controlled according to the schedule 107. The schedule 107 ensures that an average waiting time (AWT) for all the passengers is minimized. The method ends at step 415.

In an example embodiment, each floor of the building is installed with motion sensors. For example, the motion sensors may be installed in all the cabins, corridors, cafeterias, and the likes. The motion sensors may be used for quantization of each floor into tessellations or tessellation elements. Thus, each tessellation element corresponds to a motion sensor installed at a particular area on the floor. The tessellation elements may be regular shaped or irregular shaped. The motion sensors may be tracking motion of the one or more passengers all the time.

Let the time period of interest for the prediction of future arrivals be 10 seconds. The motion sensors may be configured such that when any of the motion sensors determine more than a threshold amount of passengers near an elevator request area of the floor, the motion sensor may trigger the neural network 103 based destination predictor 141. The destination predictor 141 may then retrieve partial trajectories 113 of all the passengers for last 10 seconds. The partial trajectories 113 of each passenger may be determined separately or in combination with other passengers travelling or moving along the same route. Based on the data retrieved, the destination predictor 141 predicts arrival information of potential future passengers in the form of the multinomial 111. The multinomial 111 may be then used by the control system 101 to determine continuation sets, based on which the scheduler 105 determines a schedule 107.

In another example embodiment, the control system 101 may be configured to be triggered for each employee of a company arriving at an area serviced by elevators. To that end, every employee in the building may be provided with an electronic identity card which can be read by motion sensors installed on each floor to recognize identity of the corresponding employee. The electronic identity card may be, for example but not limited to a radio frequency identity (RFID) card/tag. The control system 101 may comprise a database where identification information of all the employees may be stored. The information may comprise name of the employee, information about a floor on which the employee works, historical trajectories of the employee, work shift timing of the employee, and the likes.

The embodiments of the present disclosure include the control system 101 that controls motion of the bank of elevators 109 based on current requests from one or more passengers for service by the bank of elevators 109, and partial trajectories 113 of motion of the one or more passengers moving on a floor that comprise one or more areas serviced by the bank of elevators 109. In a preferred embodiment, the control system 101 comprises a transformer architecture based neural network that is trained for extended destination prediction based on the partial trajectories 113. In particular, the control system 101 executes the neural network 103 to produce a multinomial of the extended destination prediction for the one or more passengers based on partial trajectory of each passenger. The multinomial comprises possible destinations of each passenger and possible time instances of each passenger arriving at the destinations. The multinomial is determined by quantizing the floor into tessellation elements forming the possible destinations, and further by quantizing a period of prediction into the time instances. The period of prediction is the maximum time considered by the control system 101 for the future requests of the one or more passengers.

The embodiments of the present disclosure perform a Monte Carlo simulation of the values of the multinomial determined for the tessellation element associated with the area serviced by the bank of elevators 109 to produce multiple combinations of times of request. A frequency of occurrence of a specific time instance in the multiple combinations of times of request is a probability of future request for the elevator service at the specific time instance having a value in the multinomial at an intersection of the specific time instance and the tessellation element associated with the area serviced by the bank of elevators 109. The embodiments of the present disclosure combine each of the multiple combinations of times of request with the current request to produce multiple continuation sets, and further, determine the schedule 107 of the bank of elevators 109 to optimize a metric of performance (for example, average waiting time) for at least some passengers in combination of all of the continuation sets.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A control system for controlling motion of a bank of elevators, the control system comprising:
    a first input interface configured to accept current requests from passengers for service by the bank of elevators;
    a second input interface configured to receive a partial trajectory of a motion of a person moving on a floor serviced by the bank of elevators; and
    a processor configured to:
        submit the partial trajectory to a neural network trained for an extended destination prediction to produce a multinomial having at least two dimensions including a first dimension of destinations of the person and a second dimension of time intervals of the person arriving at the destinations of the first dimension, wherein the neural network has a transformer architecture that uses a positional encoding and an attention mechanism, that enables parallelization, wherein the floor is quantized into tessellation elements forming the destinations of the first dimension, and wherein at least one tessellation element corresponds to a service area associated with a request for a service by the bank of elevators;
        optimize a schedule of the bank of elevators to serve the current requests from passengers and future requests of the person for elevator service at the time intervals provided in the multinomial with probabilities of corresponding values in the multinomial determined for the tessellation element associated with the service area; and
        control the bank of elevators according to the schedule.

2. The control system of claim 1, wherein the time intervals of the second dimension quantize a period of prediction, and wherein the period of prediction is the maximum time considered by the control system for the future requests of the persons.

3. The control system of claim 1, wherein a sum of values of the multinomial is normalized to one.

4. The control system of claim 1, wherein the processor is further configured to:
    perform a Monte Carlo simulation of the values of the multinomial determined for the tessellation element associated with the area serviced by the bank of elevators to produce multiple combinations of times of request, wherein a frequency of occurrence of a specific time instance in the multiple combinations of times of request is a probability of future request for the elevator service at the specific time instance having a value in the multinomial at an intersection of the specific time instance and the tessellation element associated with the area serviced by the bank of elevators;
    combine each of the multiple combinations of times of request with the current request to produce multiple continuation sets; and
    determine the schedule of the bank of elevators to optimize a metric of performance for at least some passengers in combination of all of the continuation sets.

5. The control system of claim 1, wherein the partial trajectories comprise trajectories data containing only positional information, wherein each trajectory is represented by a sequence of tessellation indices, wherein the tessellation indices are obtained by discretizing a range of positional coordinates, and wherein the range of positional coordinates represent longitudes and latitudes associated with the tessellation elements.

6. The control system of claim 2, wherein the partial trajectories comprise trajectories data containing both positional information and timing information, wherein each trajectory is represented by a sequence of tuples of tessellation indices, and wherein each tuple contains tessellation indices obtained by discretizing a range of positional coordinates and the period of prediction.

7. The control system of claim 6, where the timing information of trajectories is extracted by considering relative times in terms of elapsed times with respect to their starting time stamps.

8. The control system of claim 7, wherein each trajectory is represented by a sequence of symbols, and wherein each symbol is mapped from a tuple of tessellation indices that indicates the positional information and the timing information.

9. The control system of claim 4, wherein the continuation sets are formed through filtering the destinations by considering only the area serviced by the bank of elevators.

10. A method for controlling motion of elevators of a bank of elevators, the method comprising:
    obtaining current requests from passengers for service by the bank of elevators;
    obtaining a partial trajectory of a motion of a person moving on a floor that comprises an area serviced by the bank of elevators;
    executing, upon receiving the partial trajectory of the motion of the person, a neural network trained for an extended destination prediction of the person having the motion according to the partial trajectory to produce a multinomial of the extended destination prediction for the person, wherein the neural network has a transformer architecture that uses a positional encoding and an attention mechanism, that enables parallelization, wherein the multinomial has at least two dimensions including a first dimension of destinations of the person and a second dimension of time intervals of the person arriving at the destinations of the first dimension, wherein the floor is quantized into tessellation elements forming the destinations of the first dimension, and wherein at least one tessellation element is associated with the area serviced by the bank of elevators;
    optimizing a schedule of the bank of elevators to serve the current requests from passengers and future requests of persons, for elevator service at the time intervals provided in the multinomial with probabilities of corresponding values in the multinomial determined for the tessellation element associated with the area serviced by the bank of elevators; and controlling the bank of elevators according to the schedule.

11. The method of claim 10, wherein the time intervals of the second dimension quantize a period of prediction, and wherein the period of prediction is the maximum time considered by the control system for the future requests of the persons.

12. The method of claim 10, wherein a sum of values of the multinomial is normalized to one.

13. The method of claim 10, wherein the method further comprises:

performing a Monte Carlo simulation of the values of the multinomial determined for the tessellation element associated with the area serviced by the bank of elevators to produce multiple combinations of times of request, wherein a frequency of occurrence of a specific time instance in the multiple combinations of times of request is a probability of future request for the elevator service at the specific time instance having a value in the multinomial at an intersection of the specific time instance and the tessellation element associated with the area serviced by the bank of elevators;

combining each of the multiple combinations of times of request with the current request to produce multiple continuation sets; and determining the schedule of the bank of elevators to optimize a metric of performance for at least some passengers in combination of all of the continuation sets.

* * * * *